US009217853B2

United States Patent
Rabe et al.

(10) Patent No.: US 9,217,853 B2
(45) Date of Patent: Dec. 22, 2015

(54) DIVERGENCE-CHANGING DEVICE

(71) Applicant: SCANLAB AG, Puchheim (DE)

(72) Inventors: Matthias Rabe, Puchheim (DE); Ernst Wilhelm Böckler, Puchheim (DE)

(73) Assignee: SCANLAB AG, Puchheim (DE)

( * ) Notice: Subject to any disclaimer, the term of this patent is extended or adjusted under 35 U.S.C. 154(b) by 0 days.

(21) Appl. No.: 14/403,128

(22) PCT Filed: Nov. 19, 2013

(86) PCT No.: PCT/EP2013/074135
§ 371 (c)(1),
(2) Date: Nov. 21, 2014

(87) PCT Pub. No.: WO2014/076290
PCT Pub. Date: May 22, 2014

(65) Prior Publication Data
US 2015/0253555 A1     Sep. 10, 2015

(30) Foreign Application Priority Data
Nov. 19, 2012   (DE) .................. 10 2012 111 098

(51) Int. Cl.
   *G02B 26/08*    (2006.01)
   *G02B 17/08*    (2006.01)
   *G02B 26/10*    (2006.01)

(52) U.S. Cl.
   CPC .............. *G02B 17/08* (2013.01); *G02B 26/105* (2013.01)

(58) Field of Classification Search
   CPC ............. G02B 26/105; G02B 26/0833; G02B 26/0816; G02B 19/0028; G02B 17/08; G02B 17/00; G02B 17/006; G02B 17/023; G02B 17/0615; G02B 17/0896; G02B 27/0905; B23K 26/032; B23K 26/0639; B23K 26/0807

USPC ........... 359/196.1–226.2; 219/121.6, 121.74, 219/121.75–121.8
See application file for complete search history.

(56) References Cited

U.S. PATENT DOCUMENTS 4,682,842 A    7/1987   Brueggemann
4,806,728 A    2/1989   Salzer et al.
(Continued)

FOREIGN PATENT DOCUMENTS

CN     199 60 807 C1    2/2001
CN     102 141 672 A    8/2011
(Continued)

OTHER PUBLICATIONS

International Search Report, PCT/EP2013/074135 dated Feb. 7, 2014.

*Primary Examiner* — James Phan
(74) *Attorney, Agent, or Firm* — Arent Fox LLP

(57) ABSTRACT

A divergence-changing device, comprising a ray source, a substantially telecentric arrangement, having an optical system, which has a first focal point and a first system region and a second system region, and having a ray-deflecting device, which is designed such that the beam of rays from the ray source hits the ray-deflecting device, wherein the main ray would hit/hits the ray-deflecting device at the first focal point or close to the first focal point, and that the ray-deflecting device can feed the beam of rays from the ray source to the first system region at different angles of incidence, wherein the beam of rays imaged by the first system region is deflected onto the second system region by a ray-folding device, wherein the beam of rays is imaged by the second system region such that the beam of rays hits the ray-deflecting device again and leaves the divergence-changing device with a constant position.

22 Claims, 8 Drawing Sheets

(56) References Cited

U.S. PATENT DOCUMENTS

| | | |
|---|---|---|
| 4,846,550 A | 7/1989 | Schuma et al. |
| 7,154,652 B2 | 12/2006 | Kobayashi |
| 7,978,389 B2 | 7/2011 | Ishibashi |
| 2005/0236381 A1 | 10/2005 | Nomaru |
| 2010/0284051 A1* | 11/2010 | Ishibashi .................... 359/208.1 |

FOREIGN PATENT DOCUMENTS

| | | |
|---|---|---|
| EP | 0 649 042 A2 | 4/1995 |
| EP | 1 184 700 A1 | 3/2002 |
| GB | 2 053 505 A | 2/1981 |
| JP | 09-265052 A | 10/1997 |

* cited by examiner

DIVERGENCE-CHANGING DEVICE

CROSS-REFERENCE TO RELATED APPLICATION

This application is a National Stage entry of International Application No. PCT/EP2013/074135, filed Nov. 19, 2013 which claims priority to German Patent Application No. 10 2012 111 098.0, filed Nov. 19, 2012. The disclosures of the prior applications are hereby incorporated in their entirety by reference.

FIELD OF INVENTION

The invention relates to a divergence-changing device, in particular to a divergence-changing device having a substantially telecentric optical arrangement for changing a divergence angle of an electromagnetic beam of rays in a variably adjustable manner.

BACKGROUND

Changing the divergence of electromagnetic radiation, for example of laser light, is necessary in many areas, such as in material processing or in microscopy. Changing the divergence of rays may, for example, be necessary to displace a focus of electromagnetic radiation by changing the divergence.

In laser material processing it may, for example, be necessary to focus a working focal point of a laser beam to a work piece to be processed with a rapidly changeable focal distance, so as to obtain an optimum processing efficiency, as the laser beam is often directed over a work piece at high speed by means of several controllable and movable mirrors. In this respect, different distances between a laser source and the work piece may arise due to the dimensions of the work piece, which is the reason why it may be necessary to focus the laser beam quickly, so as to achieve an efficient and precise energy transmission from the laser beam to the work piece.

A divergence-changing device for changing the divergence of electromagnetic radiation is therefore desirable.

BRIEF DESCRIPTION OF THE INVENTION

For this purpose, the invention provides a divergence-changing device for changing the divergence of an electromagnetic beam of rays in a variably adjustable manner, the electromagnetic beam of rays being described by a main ray and optionally comprising such main ray, as well as a plurality of additional rays, comprising a ray source for providing the beam of rays with at least the plurality of additional rays, a substantially telecentric arrangement having an optical system which has a first focal point, a first system region and a second system region, and having a ray-deflecting device arranged in or closely adjacent to the first focal point and which is arranged and designed in such a way that the beam of rays from the ray source hits the ray-deflecting device, wherein the main ray hits the ray-deflecting device at the first focal point or close to the first focal point, and that it can feed the beam of rays coming from the ray source to the first system region of the optical system at different angles of incidence, wherein the optical system is designed in such a way that the beam of rays is imaged by the first system region in such a way that the main ray of the beam of rays fed to the first system region is deflected from the first system region in a direction that is substantially independent of the incident angle, and in such a way that the plurality of additional rays of the beam of rays is imaged at a divergence angle different when compared to before the imaging as well as depending on the incident angle relative to the main ray, and a ray-folding device which is designed such that it deflects the beam of rays imaged by the first system region of the optical system to the second system region of the optical system, wherein the beam of rays is imaged by the second system region of the optical system in such a way that the beam of rays hits the ray-deflecting device again, wherein the main ray hits the ray-deflecting device again at the first focal point or close to the first focal point, and wherein the plurality of additional rays hits the ray-deflecting device again, wherein the beam of rays incident again is deflected by the ray-deflecting device in such a way that the main ray thereof is substantially stationary and non-collinear and/or physically separated from the main ray of the beam of rays that hits the ray-deflecting device from the source of rays.

The invention further provides a divergence-changing arrangement comprising at least or exactly two divergence-changing devices as described above, wherein the at least or exactly two divergence-changing devices are arranged in such a way that they form an upstream divergence-changing device and a divergence-changing device downstream thereof, having a common path of rays, wherein the beam of rays, the main ray of which is imaged in a stationary way by the upstream divergence-changing device forms the source of rays of the downstream divergence-changing device.

Moreover, the invention provides a ray-position-and-divergence-changing device, comprising a divergence-changing device and/or a divergence-changing arrangement as described above, a 2-D scanning system and a controller, wherein the divergence-changing device and/or the divergence-changing device arrangement and the 2-D scanning system form a common path of rays in which the divergence-changing device and the divergence-changing device arrangement, if they are respectively provided, are arranged before the 2-D scanning system, wherein the 2-D scanning system is configured to set a direction of propagation of a beam of rays coming from the divergence-changing device or the divergence-changing device arrangement and hitting the 2-D scanning system, in two spatial dimensions independent of each other, and wherein the controller is configured to set the direction of propagation by means of the 2-D scanning system and the divergence change by means of the divergence-changing device and/or the divergence-changing device arrangement in a directed and selectable way in accordance with a control information.

DETAILED DESCRIPTION

Figure 1:
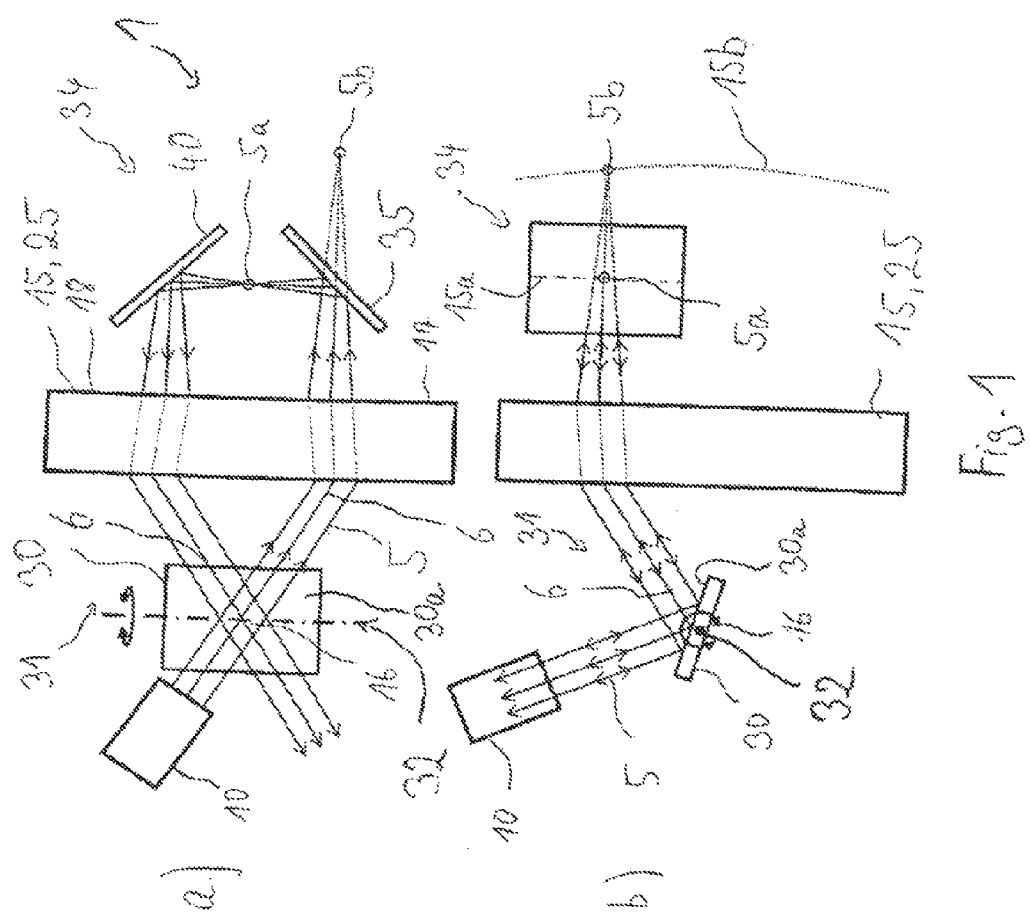
FIG. 1 schematically shows, from two perspectives, a divergence-changing device according to the present invention, comprising an optical system that is configured as a refraction system.

With reference to the Figures, the invention provides a divergence-changing device 1 for changing the divergence of an electromagnetic beam of rays 5. The divergence-changing device 1 comprises a ray source 10 for generating an electromagnetic beam of rays 5. The ray source 10 may be configured to provide or to generate an electromagnetic beam of rays 5 (hereinafter also shortly referred to as "beam of rays"), which may have any polarization, such as a linear polarization, a circular polarization or an elliptic polarization. The ray source 10 may be configured to provide beams of rays 5 having any wavelength. The ray source 10 may, for example, be a laser beam source 10, a ray source 10 for visible light or a ray source 10 for UV or IR radiation. The ray source 10 may be a pulsed laser beam source 10 which generates several pulsed, i.e. temporally interrupted beams of rays 5, or the ray source 10 may be a laser beam source 10 which generates a continuous beam of rays 5. The ray source 10 may be a high-performance ray source which generates radiation which may be suitable for material processing (for example for melting or vaporizing metals, such as steel). A beam of rays 5 generated by the ray source 10 may comprise a plurality (for example a multitude) of rays (for example individual rays), and may have any cross-sectional area, such as a circular, elliptic or polygonal cross-sectional area. The beam of rays 5 may comprise a divergence. The divergence may describe the angle at which the rays of a beam of rays converge or diverge with respect to each other. The ray source 10 may, for example, be a laser beam source 10 having a performance of greater than 2 mW (for example having a laser power class that lies above the laser power class 2), with more than 500 mW, with more than 10 W and/or with up to 20 kW. The laser beam source 10 may, for example, be pulsed radiation with a pulse duration of less than 1 μs and a pulse energy of more than 100 nJ or more than 1 mJ and/or a pulse energy of less than some Joule (for example less than 5 J). The laser beam source 10 may, for example, also generate pulsed radiation with a pulse duration of less than about 10 ps and a pulse energy of about 1 to 10 nJ, for example if the device according to the invention is used for processing or interacting with biological tissue (for example in order to carry out surgeries on the eye or something similar). Here, the ray source 10 may also be an entrance pupil (which is for example virtual) through which the divergence-changing device 1 is provided with a beam of rays 5, i.e. the ray source 10 does not have to be an actual, physical ray source 10. In this case, a beam of rays 5 is provided by means of the ray source 10, which corresponds to a bundle of rays 5 generated by an above-described "physical" ray source 10.

Here, a collimated beam of rays 5 may comprise a divergence of zero, a divergent beam of rays a positive divergence value and a convergent beam of rays a negative value. Accordingly, a beam of rays 5 may be collimated (i.e., for example, the rays of the beam of rays 5 extend substantially in parallel to each other), divergent (i.e., for example, the rays substantially diverge), or convergent (i.e., for example, the rays substantially converge), for example when it leaves the ray source 10.

In the description of the mode of operation of the divergence-changing device 1, the bundle of rays will hereinafter be represented mathematically, as it is usual in optics, by a main ray 6 which extends substantially centrally in the beam of rays 5 and characterizes the direction of propagation of the beam of rays 5, as well as a plurality of additional rays which may arranged in a bundled way around the main ray 6 and the direction of which may be tilted relative to the main ray 6 depending on the position within the beam of rays 5, whereby the divergence of the beam of rays 5 is described. The beam of rays 5 may comprise a plurality of additional rays and such a main ray 6, or the main ray may not be present in the beam of rays 5, may, for example, be blanked (for example by means of a blind) or may not be provided by the ray source 10. In this case, the main ray 6 may be a virtual main ray which may substantially describe/characterize the direction of propagation of the beam of rays 5.

This conception as to the functional description does, however, not limit the possible characteristics of the beam of rays 5; in this respect, the beam of rays 5 may be composed of several partial beams with a different geometry, wave length and polarization. In the same way, beams of rays 5 may be provided according to the invention, the distribution of intensity of which across the cross section is inhomogeneous or asymmetrical or the distribution of intensity of which in the region of the main ray 6 has a minimum or a maximum.

If hereinafter the term "imaging" (or "to image") is used with respect to rays or beams of rays, this may mean that a first ray is deflected or directed through an optical system/optical element in such a manner that it is described by a second ray or beam of rays in the further course following the optical system. In this context, the first ray or the first beam of rays is imaged to the second ray or the second beam of rays. With respect to points, the term "imaging" (or "to image") may be understood within the meaning of optical imaging.

The divergence-changing device 1 comprises an optical system 15 which, together with a ray-deflecting device 30 arranged at or close to a first focal point 16 of the optical system 15, forms a substantially telecentric arrangement 31. A telecentric (optical) arrangement is considered as an arrangement having a telecentric imaging property. A telecentric imaging property is, for example, present if a ray which hits the optical system 15 through the first focal point 16 of the optical system 15, is deflected in a direction independent of the angle of incidence and/or the position, at which or in which it hits the optical system 15. In other words, rays which pass through the first focal point 16 and hit the optical system 15 are deflected in parallel to each other in a direction which is independent of the angle of incidence or the position of incidence onto the optical system 15 in case of a telecentric imaging. The optical system 15 may be configured in such a manner that it has imaging properties which correspond to those of a parabolic mirror (for example, an incident beam of rays may be imaged with respect to its divergence in such a way as if it would have been reflected by a parabolic mirror). According to the invention, a telecentric imaging may, for example, be achieved by means of a telecentric arrangement 31 having an optical system 15 which has a reflection system 20 (for example a parabolic reflector 20) or a telecentric refraction system 25 (for example a lens system) or in another way. The telecentric arrangement 31 may have such a structure and/or may be produced using such materials that it is suitable for imaging beams of rays 5 which transmit a high amount of power.

The optical system 15 comprises a first system region 17 and a second system region 18. The first system region 17 and the second system region 18 may have different optical properties or equal optical properties and may be configured to be physically separated from each other (for example as separate regions) or may be formed to be monolithic (for example in a monolithically integral manner) with respect to each other. For example, the first system region 17 and the second system region 18 may be formed by a respective individual, separate reflection system (for example a parabolic mirror) or respectively by an individual, separate refraction system (for example a lens system, for example comprising one or more transmissive optical elements or, for example, a telecentric objective).

The first system region 17 and the second system region 18, which form the optical system 15, may together provide the telecentric imaging property of the telecentric arrangement 31 by cooperating with the ray-deflecting device 30. This means that the first system region 17 may have a telecentric imaging property and the second system region 18 may have a telecentric imaging property, wherein one (the object-side) focal point of the first system region 17 and one (the image-side) focal point of the second system region 18 substantially coincide at the location of the first focal point 16, so as to form the first focal point 16 together.

According to the invention, a ray which does not hit the first system region 17 of the optical system 15 through the first focal point 16 is deflected from the first system region 17 of the optical system 15 at an angle with respect to a ray which hits the first system region 17 of the optical system 15 through the first focal point 16.

According to the invention, the ray of the beam of rays 5 which hits the first system region 17 of the optical system 15 through the first focal point 16 (or a point which is located close to the first focal point 16) is the main ray 6, and other rays of the beam of rays 5 are the additional rays. In the case of a non-existing, for example blanked-out or non-provided main ray 6, the correspondingly notionally/virtually existing main ray 6 would hit the focal point 16 or would hit the focal point 16 close thereto. It is not necessary that all rays generated by the ray source 10 form part of the beam of rays 5 which, for example, hits the first system region 17, the second system region 18 and/or the ray-deflecting device 30, but the beam of rays 5 may be a subset of the rays which are provided or generated by the ray source 10.

The angle at which an additional ray of a beam of rays 5 is deflected from the first system region 17 to the main ray 6 of the beam of rays 5 depends on the angle of incidence (and/or the location of incidence) at which the beam of rays 5 hits the first system region 17 of the optical system 15. Accordingly, the divergence of a beam of rays 5 which has been imaged by the first system region 17 of the optical system 15 may differ (for example may be less or greater than) from the divergence of the same beam of rays 5 prior to the imaging by the first system region 17 of the optical system 15. As mentioned above, the angle defined by an additional ray with the main ray 6 following an imaging by the first system region 17 of the optical system 15 may depend on the location and/or the angle at which the beam of rays 5 hits the optical system 15 (and the first system region 17 thereof, respectively).

This results, for example, in that the main ray 6 which passes through the first focal point 16 is deflected in a direction which is independent of the angle of incidence and/or the position at which/where the main ray 6 hits the first system region 17. The other rays of the beam of rays 5 which are referred to as additional rays herein, which are imaged by the first system region 17 of the optical system 15, define an angle relative to this main ray 6 passing through the first focal point 16, the angle depending on the angle of incidence and/or the position of incidence of the beam of rays 5 onto the first system region 17.

An angle that is defined between a main ray 6 and an additional ray of a beam of rays 5 (or, for example, between two additional rays which define a plane with the main ray) (angle of divergence) is different after an imaging by the first system region 17 of the optical system 15 from the angle of divergence before the imaging, for example less or greater than the same. This may, for example, result in that a divergent or collimated beam of rays 5 which hits the optical system 15 through the first focal point 16 and is imaged, is imaged as a convergent beam of rays 5 by the first system region 17 of the optical system 15, or that a divergent beam of rays 5 is imaged by the first system region 17 of the optical system 15 as a divergent beam of rays 5 with a lower divergence. Likewise, a for example convergent beam of rays 5 may be imaged by the first system region 17 of the optical system 15 as a convergent beam of rays 5; in this respect, a convergent property of the beam of rays 5 may be more distinctive after the imaging by the first system region 17 of the optical system 15 than before the imaging.

If a beam of rays 5 is imaged by the first system region 17 of the optical system 15 as a convergent beam of rays 5, this convergent beam of rays 5 may form a focus 5a or a focus line 5a. The focus 5a may be the point at which several (for example all) rays of the convergent beam of rays 5 converge after the beam of rays 5 has been imaged by the first system region 17 of the optical system 15. The focus line 5a may be a line that appears when, for example, the focus is prevented from being formed by elements in the ray path before and/or within and/or after the divergence-changing device, as it may be the case if the optical system 15 comprises additional cylindrical lenses or additional parabolic mirrors according to the invention (or is configured accordingly) or if the mirrors of the ray-folding device 34 have an appropriate cylindrical refractive power (e.g. are formed as parabolic mirrors). In order to simplify the description, the term "focus" shall hereinafter be used both for the focus 5a and for the focus line 5a.

The focus 5a does not have to be formed as an exact point either, but may also be blurred due to the aberrations caused by the first system region 17. The aberrations may, for example, be compensated at least in part by an appropriate (for example symmetrical) direction of the ray through the second system region 18. An optical system 15 which is formed as a reflection system 20 may be more suitable in some applications than an optical system 15 which is formed as a refraction system 25, since less or no chromatic aberrations/image defects at all are generated. When forming a blurred "focus" 5a, i.e. a focus having a greater spatial expansion (i.e. also in case of a focus line), the optical power density is reduced in the region of the focus 5a, which is, for example, advantageous in connection with ray sources with a high power density. In the exemplary embodiments shown in FIGS. 2 and 3 it may be advantageous in some cases that a "blurred" focus 5a/b is formed by the first imaging at the first system region 17 (which results in a lower power density at the focus) and this blurring of the focus 5a/b is compensated again by the imaging at the second system region 18 due to the symmetrical properties of the optical system 15.

According to the invention, the focus 5a may occur only outside the divergence-changing device 1 in the ray path of the divergence-changing device 1. For example, a divergence of the beam of rays 5 imaged by the first system region 17 of the optical system 15 may be such that there is no actual focus 5a within the divergence-changing device 1 (this means, for example, as it is described hereinafter, before a second deflection of the beam of rays 5 by the ray-deflecting device 30), although the beam of rays 5 imaged by the first system region 17 of the optical system 15 may be convergent. For example, the ray path of the divergence-changing device 1 may be configured in such a way that a convergent beam of rays 5 does not form a focus 5a until outside the divergence-changing device 1 (which then, for example, may also be the working focus) or also never forms an actual focus 5a but is only imaged in such a way that it would form a virtual focus 5b without any further interference in the ray path of the divergence-changing device 1. The foci 5a/b may be arranged depending on the angle of incidence of the beam of rays 5 onto the first system region 17 of the optical system 15 on a focal area (for example a focal plane), i.e. a focus 5a/b may be arranged depending on the angle of incidence and/or the position of incidence of the beam of rays 5 onto the first system region 17 of the optical system 15 at another position in the focal area. A focal area may be a curved focal area or a plane focal area (focal plane).

By analogy to the virtual foci 5b and as a result thereof, also the focal area may be an actual focal area 15a or a virtual focal area 15b, on which the virtual foci 5b would lie if the beam of rays 5 were not subject to any further interaction with components of the divergence-changing device 1.

According to the invention, a virtual focus 5b and an actual focus 5a (cf. FIG. 1) may also be present at the same time; in this respect, the virtual focus 5b may be the focus that would be formed by a beam of rays 5 imaged by the first system region 17 of the optical system 15, if there were no interaction with components of the divergence-changing device 1, and the actual focus 5a may be a focus, the position of which differs from that of the virtual focus 5b due to an interaction of the beam of rays 5 with components of the divergence-changing device 1.

According to the invention, the optical system 15 may be configured in such a way that the foci 5a (and the virtual foci 5b, respectively) of all beams of rays 5, the main ray 6 of which hits the first system region 17 of the optical system 15 through the first focal point 16 (or a point close thereto), and which are imaged by the first system region 17 of the optical system 15, lie on a focal area 15a (which by analogy to the virtual foci 5b may be a virtual focal area 15b). The properties and the position of the focal area 15a/b are a result of the optical properties of the optical system 15. The optical system 15 may be configured in such a way that the focal area 15a/b is a curved focal area 15a/b, or it may be a focal plane 15a/b tilted with respect to an optical axis of the optical system 15 (for example, the tilted focal plane may be configured in such a way that the main ray 6 of a beam of rays 5 imaged by the first system region 17 of the optical system 15 hits the tilted focal plane 15a/b independent of the angle of incidence of the beam of rays 5 onto the first system region 17 of the optical system 15 in a direction which is not the normal direction of the tilted focal plane 15a/b) or it may be another focal plane 15a/b.

Accordingly, the foci 5a/b of all beams of rays 5 which pass through the first focal point 16 of the optical system 15 and are imaged by the first system region 17 of the optical system 15 may lie on a curved focal area 15a/b. The curvature of the curved focal area 15a/b may be caused by the configuration of the optical system 15 and may, for example, be a focal area 15a/b curved in a parabolic manner and/or a focal area 15a/b curved in a paraboloidal manner. The curved focal area 15a/b may also take other forms with a corresponding configuration of the optical system 15; for example, the curved focal area 15a/b may also be defined by a function (for example a polynomial) with another exponent than 2 (as in the case of the parabola); for example, the exponent may be 4 or 6 (or, for example, 3 or 5), and/or may also be a rational value in the range of 2 to 6. Also parameters such as the parabola parameter or other parameters of a function defining the curved focal area 15a/b may be selected freely.

The telecentric arrangement 31 of the divergence-changing device 1 comprises a ray-deflecting device 30. The ray-deflecting device 30 is arranged in or close to (for example adjacent to, for example adjoining) the first focal point 16 of the optical system 15 and is provided to deflect a beam of rays 5 hitting the ray-deflecting device 30 onto the first system region 17 of the optical system 15. The ray-deflecting device 30 is configured to set the position of impact and/or the angle of impact of the beam of rays 5 deflected onto the first system region 17 of the optical system 15. The ray-deflecting device 30 may, in cooperation with the optical system 15, serve to offset the (as the case may be virtual) focus 5a/b of a beam of rays 5 on a (as the case may be virtual) focal area 15a/b by setting the point of impact and/or the angle of impact of the beam of rays 5 onto the first system region 17 of the optical system 15 by means of the ray-deflecting device 30.

The ray-deflecting device 30 may, for example, be a rotatable mirror 30 with a degree of freedom (i.e., for example, it may have an axis of rotation 32). For rotating the rotatable mirror 30, it may be connected to an actuator (for example in a torque proof manner). An actuator may, for example, be a scanner or a galvanometer drive, which are capable of enabling a fast rotation of the rotatable mirror 30. The ray-deflecting device 30 may be a galvanometer scanner comprising a mirror that is rotatably connected to a galvanometer drive. The ray-deflecting device 30 may have such configuration and/or may be produced using such materials that it is suitable for imaging beams of rays 5 with a high amount of energy/power.

In addition, the divergence-changing device 1 may be provided with a controller 50 (see for example FIG. 2 or 4) according to the invention, so as to control the ray-deflecting device 30 in such a way that it can set an angle of incidence and a position of incidence, respectively, of the beam of rays 5 onto the optical system 15 selectively and in a controllable way. If the ray-deflecting device 30 comprises, for example, a rotatable mirror 30 which is rotatable by means of an actuator, the controller can control the actuator, which in turn can generate a rotation of the mirror by a predetermined angle of rotation by a mechanical rotation of the mirror. The controller 50 may, in addition, also be connected to the ray source 10, so as to control operation of the ray source 10. The controller 50 may be configured in such a way that it can set a divergence and a divergence change, respectively, of the beam of rays incident from the second system region 18 onto the ray-deflecting device 30 as a function of an input value and/or of an algorithm. For example, the controller 50 may be provided with a desired divergence value by a user or by another controller, and the controller may set the divergence by means of a corresponding setting of the ray-deflecting device 30, for example also using a feedback control which uses an actual, measured divergence of the beam of rays 5 as a feedback variable.

The rotatable mirror 30 may comprise a first mirror surface 30a which may be configured as a plane mirror or which may be configured as a mirror surface 30a having another geometry, for example as a parabolic mirror surface, a parabola mirror surface or as a free-form mirror surface. According to exemplary embodiments, the ray-deflecting device 30 may also be configured as a rotatable double mirror 30 having a first 30a and a second 30b mirror surface, which may be arranged to be substantially parallel to each other, wherein the respective surface normals of the mirror surfaces are arranged in an opposed way. The first mirror surface 30a may also define an angle with the second mirror surface 30b.

The ray-deflecting device 30 may, for example, also be an acousto-optical ray-deflecting device, an electro-optical ray-deflecting device or a piezoelectrially driven ray-deflecting device or may comprise one of these in addition or as an alternative.

The divergence-changing device 1 comprises a ray-folding device 34. The ray-folding device 34 is configured in such a way that it leads back a beam of rays 5 which has been imaged by the first system region 17 of the optical system 15 to the ray-deflecting device 30 through the optical system 15 again, namely through the second system region 18 of the optical system 15. For example, the ray-folding device 34 may reflect a beam of rays 5 which is deflected to the first system region 17 of the optical system 15 by means of the ray-deflecting device 30 and imaged by the first system region 17 by means of the optical system 15, to the second system region 18 of the optical system 15. The ray-folding device 34 may be configured in such a way that a main ray 6 of a beam of rays 5, which is incident in the ray-folding device 34, is substantially parallel to the main ray 6 of the beam of rays 5, which leaves the ray-folding device 34, and the emergent beam of rays 5 may have a direction of propagation opposed to the incident one. The ray-folding device 34 may also be configured in such a way that the main ray 6 of a beam of rays 5, which is incident in the ray-folding device 34, is not parallel to the main ray 6 of the beam of rays 5, which leaves the ray-folding device, for example if the first and the second system region 17 are tilted relative to each other with respect to their optical exes and the ray-folding device 34 is configured and arranged in such a way that it compensates the tilting.

The ray-folding device 34 may be configured and arranged in such a manner that a main ray 6 of a beam of rays 5 incident thereon is at a distance to the main ray 6 of the beam of rays 5 emerging therefrom, and the main ray 6 of the incident beam of rays 5 and the main ray 6 of the emergent beam of rays 5 may be symmetrical with respect to a plane of the optical system 15 which includes the optical axis. As it is shown, for example, in FIG. 4, the ray-folding device 34 may also be configured and arranged in such a manner that there is no such symmetry.

The ray-folding device 34 may be stationary and torque-proof with respect to the optical system 15. The ray-folding device 34 may comprise a first ray-folding mirror 35 and/or a second ray-folding mirror 40. The first 35 and/or the second 40 ray-folding mirrors may be stationary with respect to the optical system 15 and may each define a (for example unchangeable) defined angle with each other and/or with the optical system 15. The first ray-folding mirror 35 and/or the second ray-folding mirror 40 may each comprise a plane mirror or may be one. The ray-folding device 34 (for example the first 35 and/or the second 40 ray-folding mirror) may be configured in such a way that it is suitable for reflecting laser radiation with high power, as it is used, for example, in material processing.

The first ray-folding mirror 35 may be arranged in such a manner that the beam of rays 5 hits the first ray-folding mirror 35 after the for example substantially telecentric imaging by the first system region 17 of the optical system 15 of the telecentric arrangement 31, for example at an angle with respect to the main ray 6 of substantially 45° or at another angle. The first ray-folding mirror 35 may be arranged in such a way that a beam of rays 5 imaged in a convergent way by the optical system 15 hits the first ray-folding mirror 35 in a convergent way (i.e., for example geometrically, before the beam of rays 5 forms a focus 5a on the curved focal area 15a) or hits the first ray-folding mirror 35 in a divergent way (i.e., for example geometrically, after the beam of rays 5 forms the focus 5a on the curved focal area 15a and diverges the beam of rays 5). The first ray-folding mirror 35 may be configured in such a way that it deflects the beam of rays incident thereon at an angle, such that the beam of rays 5 incident on the first ray-folding mirror 35 defines an angle with the beam of rays 5 emergent from the first ray-folding mirror 35 (for example with respect to a main ray 6 of the beam of rays 5).

The second ray-folding mirror 40 may be arranged in such a way that the beam of rays 5 deflected by means of the first ray-folding mirror 35 hits the second ray-folding mirror 40, for example at an angle of substantially 45° with respect to the main ray 6 or at another angle. The second ray-folding mirror 40 may be arranged in such a manner that a beam of rays 5 imaged by the first system region 17 of the optical system 15 in a convergent way and further deflected by the first ray-folding mirror 35 hits the second ray-folding mirror 40 in a convergent way (i.e., for example geometrically, before the beam of rays 5 forms the focus 5a on the curved focal area 15a) or hits the second ray-folding mirror 40 in a divergent way (i.e., for example geometrically, after the beam of rays 5 forms the focus 5a on the curved focal area 15a and diverges the beam of rays 5). The second ray-folding mirror 40 may be configured in such a way that it deflects the beam of rays incident thereon at an angle, so that the beam of rays 5 incident onto the second ray-folding mirror 40 defines an angle with the beam of rays 5 emergent from the first ray-folding mirror 40 (for example with respect to a main ray 6 of the beam of rays 5).

Other ray-folding intermediate mirrors may be arranged between the first ray-folding mirror 35 and the second ray-folding mirror 40, through which the beam of rays 5 may be deflected from the first ray-folding mirror 35 to the second ray-folding mirror 40.

The ray-folding device 34 may also comprise a number of ray-folding mirrors other than two ray-folding mirrors.

According to exemplary embodiments of the invention, ray-folding mirrors (for example the first ray-folding mirror 35, which is located in the ray path after the first system region 17, and the second ray-folding mirror 40, which is located in the ray path before the second system region 18) may be provided with a cylindrical imaging property (i.e. may, for example, be formed as parabolic mirrors), so as to prevent a "point-shaped" focus 5a having a high power/energy density from being formed.

The ray-folding device 34 may also comprise a plurality of prisms by which a beam of rays 5 is deflected, for example from a first system region 17 of the optical system 15 to a second system region 18 of the optical system 15.

The ray-folding device 34 may also comprise at least one lens (for example a collecting lens) and a mirror which is located at (or close to) the focal point of this lens, wherein the lens and the mirror may be configured and arranged in such a manner that a beam of rays 5, hitting the ray-folding device 34 coming from the first system region 17 of the optical system 15, is deflected by means of the ray-folding device 34, as described above, onto the second system region 18 of the optical system 15.

The beam of rays 5 hitting the second system region 18 of the optical system 15 of the telecentric arrangement 31 through the ray-folding device 34 may be imaged by the optical system 15 (and the second system region 18 thereof, respectively) in a functionally reversed manner (for example in a reversed telecentric manner), and the main ray 6 of the beam of rays 5 may be deflected from the second system region 18 of the optical system 15 to the first focal point 16 of the optical system 15 again, and other rays of the beam of rays 5 may be imaged at an angle with respect to the main ray which is imaged onto the first focal point 16, so that a convergent, collimated or divergent beam of rays 5 may be generated. The divergence of the beam of rays that leaves the divergence-changing device can thus be set by the setting of an angle of deflection of the ray-deflecting device in a setting region.

The components of the divergence-changing device 1 (for example ray source 10, optical system 15, ray-deflecting device 30, ray-folding device 34) may be arranged in such a manner that a beam of rays 5 which is generated by the ray source 10 may optionally hit the ray-deflecting device 30 directly ("directly" may mean herein that no other optical component is arranged between two components, except for a medium such as air or another gas).

The ray-deflecting device 30 is arranged at a first focal point 16 of the optical system 15 or (for example closely) adjacent to the first focal point 16 and is configured in such a manner that it deflects the beam of rays 5 onto the first system region 17 of the optical system 15. The beam of rays 5 may hit the optical system 15 by means of the ray-deflection device 30 at a different angle of incidence (and/or at a different position) (in the case of a rotatable mirror as ray-deflecting device 30, for example, depending on an angle of rotation of the rotatable mirror 30). As described above, this results in that the beam of rays 5 is imaged by the first system region 17 with a divergence that is lower when compared to before the imaging in such a manner that the beam of rays 5 emerges from the first system region 17 of the optical system 15. If the beam of rays 5 is imaged as a converging beam of rays 5, the beam of rays may form a (for example virtual) focus 5a/b which, depending on the angle of incidence of the beam of rays 5 onto the first system region 17 of the optical system 15 may lie on a (as the case may be virtual) curved focal area or (as the case may be virtual) tilted (for example virtual) focal plane 15a/b. The tilted focal plane 15a/b may, for example, be tilted with respect to an optical axis of the optical system 15, i.e. the optical axis may intersect the tilted focal plane in a direction which is not the normal direction of the focal plane. Thus, a (virtual) focus 5a/b of the beam of rays 5 may be offset on the (virtual) focal area/focal plane 15a/b depending on the ray-deflecting device 30.

The divergence-changing device 1 may be provided to set a working focus (for example on a work piece surface) of a beam of rays 5 which is provided by the ray source 10, by being fed to the first system region 17 of the optical system 15 at different angles of incidence (and/or different positions of incidence) by means of the ray-deflecting device 30, whereby a divergence of the beam of rays 5 imaged by the optical system 15 can be set. The beam of rays 5 imaged by the first system region 17 of the optical system 15 may be deflected to the optical system 15 again by means of the ray-folding device 34 (onto the second system region 18 thereof), and may be imaged in a functionally reversed telecentric way by the second system region 18 of the optical system 15, so that the main ray 6 of the imaged beam of rays 5 hits the ray-deflecting device 30 again at the first focal point 16 (or a point close to the focal point 16). Thereby, an output position and output direction of the ray emerging from the ray-deflecting device 30 (which comes from the second system region 18) is held constant, substantially independent of an angle of incidence and a position of incidence, respectively, at which or where the beam of rays 5 hits the first system region 17 of the optical system 15. Thus, a focus that is adjustable in its position along the direction of propagation of the beam of rays 5 may be realized in a working plane, for example outside the divergence-changing device 1 using the divergence-changing device 1 with or without an additional focusing device, wherein the position and the direction of the ray emergent from the ray-deflecting device 30 may be constant and independent of the position of the focus (after a double imaging by means of the optical system 15).

In other words, the curvature or tilting of the focal area 15a/b may result in that entire divergence change of the beam of rays 5, which occurs during the passing through the divergence-changing device 1 in total, depends on the angle of deflection of the ray-deflecting device 30 as set. In those embodiments where a real (i.e. actual) focus 5a (intermediate focus) or a real focus line 5a (intermediate line focus) is generated, the reason for the change in divergence lies in the adjustable path length of the path along the main ray 6 from the focus 5a to the second system region 18 (if the focus and the focus line 5a, respectively, is formed only virtually, the description applies by analogy). This path length varies due to the curvature or the tilting of the focal area 15a/b and may be set by choosing an angle of deflection of the ray-deflecting device 30. Hereby, the focus 5a/b is imaged by the second system region 18 onto points at different (positive or negative) distances, which corresponds to different angles of divergence. For this purpose, it is necessary that the imaging properties of the second system region 18 do not compensate the curvature or tilting of the focal area 15a/b caused by the first system area 17 fully (for example even reinforce it). In the divergence-changing devices 1 shown in FIGS. 1 to 5, this may, for example, be the case if first and second system regions 17 and 18 of the same type are used, for example two symmetrical or similar (for example scaled) objective halves or equally oriented paraboloid segments, or if the system regions 17 and 18 are monolithically integral axis-symmetrical paraboloids or monolithically integral axis-symmetrical lens systems.

The divergence-changing device 1 may be arranged and configured in such a way that a focus 5a of the beam of rays appears between the optical system 15 and the first ray-folding mirror 35, between the first ray-folding mirror 35 and the second ray-folding mirror 40 (for example in the ray path before or after a ray-folding intermediate mirror (see below)), and/or between the second ray-folding mirror 40 and the optical system 15, and/or the divergence-changing device 1 may be configured in such a way that a focus appears only outside the divergence-changing device 1 and/or no actual and/or virtual focus 5a/b appears.

All components of the divergence-changing device 1 may be arranged in such a way that they are arranged remote from a focus 5a of the beam of rays 5, whereby the maximum electromagnetic power density (intensity) or the maximum electromagnetic energy density (with pulsed radiation) to which the components of the divergence-changing device 1 are exposed may be reduced. Thereby, the divergence-changing device 1 may be suitable for being used with strong ray sources (for example high-performance ray sources) 10, as they may be required, for example, for material processing.

The divergence-changing device 1 (and the optical system 15, respectively) may comprise additional optical components, such as one or more cylinder lenses in the ray path, by means of which a "point-shaped" focus 5a may be prevented from being actually formed, so as to avoid a high power density (energy density) at a point. For example, a first optical element may be arranged with a cylindrical imaging property in the ray path after the first ray-folding mirror 35, and another optical element comprising a functionally reversed cylindrical imaging property substantially corresponding to the first optical element may be arranged in the ray path before the second ray-folding mirror 40 (or, for example, in a more general way before the last ray-folding mirror in the ray path before a second imaging by the optical system 15). The focus may thus be a virtual focus line 5b and/or may be a (an actual) focus line 5a.

The ray source 10, the optical system 15, the ray-deflecting device 30 and the ray-folding device 34 may optionally be arranged in such a way that no other optical components are located therebetween, i.e. they may be arranged directly one after another in a ray path. An optical component, for example having a positive refractive power (for example a collecting lens) may be provided in the ray path between the ray source 10 and the ray-deflecting device 30 or in the ray path after a second imaging by the optical system 15, for example after a (second) deflection by the ray-deflecting device 30, or at another location and/or (at the same time or as an alternative) an optical component having a negative refractive power (for example a dispersing lens) may be provided in the ray path between the ray source 10 and the ray-deflecting device 30 or in the ray path after a second imaging by the optical system 15, for example after a (second) deflection by the ray-deflective device 30 or at another location.

According to the invention, the ray-deflecting device 30, the optical system 15 and the ray-folding device 34 may be arranged and configured in such a way that the main ray 6 of a beam of rays 5 that hits the ray-deflecting device 30 coming from the ray source 10 for the first time, hits it along a first half-line (for example a straight line). An end point of the first half-line may lie in or near the first focal point 16, and the beam of rays 5 may hit the ray-deflecting device 30 coming from the ray source 10 extending along the first half-line towards the end point of the first half-line. The second ray-folding mirror 40 may be arranged in such a way that it deflects the beam of rays 5 in such a way that it hits the optical system 15 again, i.e. hits the second system region 18 of the optical system 15, so that the main ray 6 of this beam of rays 5 is deflected through the second system region 18 of the optical system 15 onto the first focal point 16 again, in order to there (or close thereto) hit the ray-deflecting device 30 again, and so that the additional rays (or a part of the additional rays) of this beam of rays 5 hit the ray-deflecting device 30 again. The main ray 6 of this beam of rays 5 may then be deflected away from the ray-deflecting device 30 along a second half-line (for example a second straight line), the end point of which may lie in or near the first focal point 16, wherein the second half-line substantially has a constant and independent position which is independent of the angle of incidence and the position of incidence of the beam of rays 5 onto the optical system 15, and the additional rays (or a part of the additional rays) may be deflected correspondingly. The above-described second half-line is, except for at most one common point (for example, the end points of the first half-line and of the second half-line may converge at/near the first focal point 16) not identical with the first half-line, but may be collinear with respect thereto (for example in a divergence-changing device 1 which is based on the exemplary embodiment described in more detail below and shown in FIG. 5). Thereby, the beam of rays 5 that leaves the ray-deflecting device 30 coming from the optical system 15 is physically separate from the beam of rays 5 coming from the ray source 10 and may leave the ray-deflecting device 30 in a substantially constant direction and position.

FIG. 1 schematically shows an embodiment of the invention in which the optical system 15 is provided as a refraction system 25, the ray-deflecting device 30 is provided as a rotatable mirror 30 with a first mirror surface 30a, and the ray-folding device 34 is formed as a first ray-folding mirror 35 and a second ray-folding mirror 40. Here, the refraction system 25 comprises a first system region 17 and a second system region 18 which are formed in a monolithically integral way. FIG. 1a shows a view of this divergence-changing device 1 from above and FIG. 1b shows a side view of the substantially same divergence-changing device 1.

The refraction system 25 may, for example, be an objective (for example a lens system) having a first focal point 16. The first focal point 16 may be at a finite distance to the refraction system 25. The refraction system 25 is provided with the rotatable mirror 30 as a one-side telecentric arrangement 31. Here, the refraction system 25 is configured in such a way that a ray of the beam of rays 5 hitting the first system region 17 of the refraction system 25 through the first focal point 16 (main ray 6) is deflected in a substantially constant direction independent of the angle of incidence, and the rays of the beam of rays 5, which do not hit the first system region 17 of the optical system 15 through the first focal point 16 (additional rays) are imaged with a divergence with respect to the main ray 6 which is different from (i.e. greater or less than) the divergence before the imaging by means of the refraction system 25. In the case of a beam of rays 5 which leaves the first system region 17 of the refraction system 25 in a converging way (as it is also shown in FIG. 1), a focus of the beam of rays 5 may arise. It can be seen from FIGS. 1a and 1b that the beam of rays 5 is imaged onto a virtual focus 5b by the first system region 17 of the refraction system, but that the converging beam of rays 5 is deflected in such a way that an actual focus 5a arises which has another position than the virtual focus 5b due to the arrangement and the configuration of the first ray-folding mirror 35.

The refraction system 25 (and the first system region 17 thereof, respectively) is configured in such a way that all virtual foci 5b of the beam of rays 5 lie on a curved virtual focal area 15b and the position of a virtual focal point 5b on the virtual focal area 15b depends on the angle of incidence at which the beam of rays 5 hits the refraction system 25. Accordingly, also the actual foci 5a lie on a correspondingly curved focal area 15a (cf. FIG. 1b) which, however, has another position and orientation than the virtual focal area 15b due to the ray-folding mirror 35.

In order to adjust the angle of incidence of the beam of rays 5 to the refraction system 25, the rotatable mirror 30 is provided in such a way that a beam of rays 5, which is incident from the ray source 10 onto the rotatable mirror 30 (i.e. the first mirror surface 30a thereof) is supplied by means of the rotatable mirror 30 (and the first mirror surface 30a, respectively) to the refraction system 25 in the first system region 17, namely in such a way that the angle of incidence of the beam of rays 5 onto the first system region 17 of the refraction system 25 depends on the angle of rotation of the rotatable mirror 30 (and the first mirror surface 30a, respectively). As described above, the first ray-folding mirror 35 and the second ray-folding mirror 40 are arranged in such a way that the beam of rays 5 imaged by the first system region 17 of the refraction system 25 is deflected back onto the refraction system 25, namely onto the second system region 18 thereof. In this respect, the beam of rays 5 is deflected in such a way that it hits the second system region 18 of the refraction system 25 on the same side on which it has left the refraction system 25 in the first system region 17. The main ray 6 of the beam of rays 5 which hits the second system region 18 is deflected onto the first focal point 16 again, and there (or close thereto) hits the first mirror surface 30a of the rotatable mirror 30 again. The additional rays of the beam of rays 5 are deflected (imaged) correspondingly. Thus, a divergence of the rays of the beam of rays 5 may be increased or reduced or unchanged by the repeated, reverse imaging by the refraction system 25.

Figure 2:
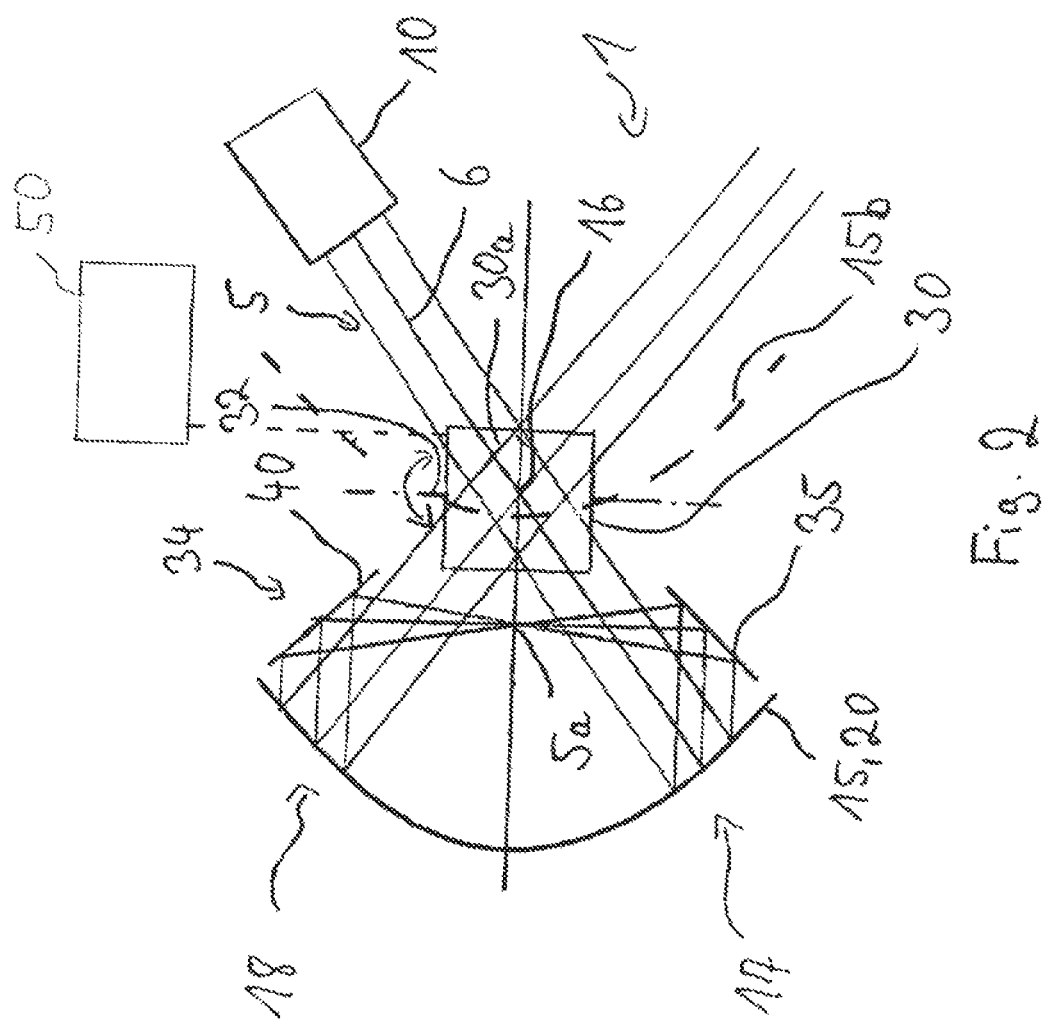
FIG. 2 schematically shows a divergence-changing device according to the present invention comprising an optical system configured as a reflection system.

FIG. 2 shows an embodiment of the invention in which the optical system 15 of the telecentric arrangement 31 is configured as a reflection system 20 with a parabolic mirror 20, and which, similar to as shown in FIG. 1, comprises a rotatable mirror 30 with a first mirror surface 30*a* as a ray-deflecting device 30, as well as a first 35 and a second 40 ray-folding mirror as the ray-folding device 34. The parabolic mirror 20 has a first focal point 16 and a first system region 17 and a second system region 18, wherein the first focal point 16 is at a finite distance to the parabolic mirror 20. The parabolic mirror 20 has the feature that a ray hitting the parabolic mirror 20 through the (or through a point close thereto) first focal point 16 is reflected in a direction which is substantially independent of the angle of incidence (and the position of incidence) of the ray onto the parabolic mirror 20, so that such rays are deflected in a constant direction substantially in parallel to each other and at a distance from each other. Here, the parabolic mirror 20 has a shape and a reflection face, respectively, which is substantially described by a paraboloid equation. With respect to FIGS. 2 and 3, the parabolic mirror 20 may have a paraboloid shape (and reflection face, respectively), for example, it may have a rotation paraboloid surface. It is one imaging property of the parabolic mirror 20 that rays hitting the parabolic mirror 20 through the first focal point 16 are deflected in a direction which is independent of the angle of incidence and the position of incidence onto the parabolic mirror 20, and rays which do not hit the parabolic mirror 20 through the first focal point 16 are deflected at an angle to rays which hit the parabolic mirror 20 through the first focal point 16. The geometrical dimensions of the components of the divergence-changing device 1 (for example of the parabolic mirror 20, i.e. for example the angle of rotation that a (rotational) parabolic mirror 20 according to the invention spans) may be chosen in accordance with the desired properties of the divergence-changing device 1 in such a way that they substantially correspond to the minimum required dimensions.

Figure 3:
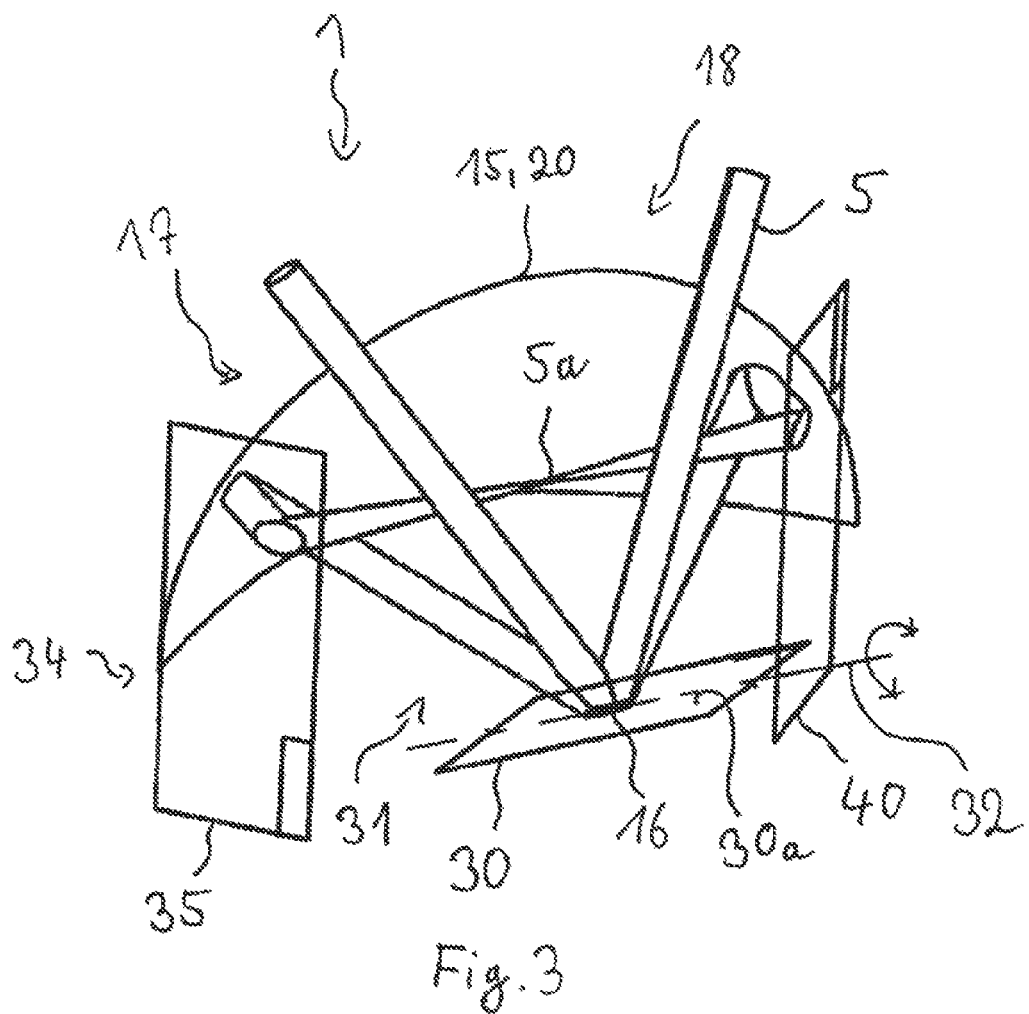
FIG. 3 schematically shows a perspective view of a divergence-changing device according to the present invention comprising an optical system configured as a reflection system.

The telecentric arrangement 31 of the divergence-changing device 1 which is shown in FIGS. 2 and 3 comprises a ray-deflecting device 30 which is formed as a rotatable mirror 30 having a first mirror surface 30*a*, and a ray-folding device 34 which is formed as a first 35 and a second 40 ray-folding mirror. According to FIGS. 2 and 3, a beam of rays 5 hits the first mirror surface 30*a* of the rotatable mirror 30 from the ray source 10 and is deflected thereby onto the first system region 17 of the parabolic mirror 20, wherein the rotatable mirror 30 (and the first mirror surface 30*a* thereof, respectively) may be arranged in the first focal point 16 or close (for example adjacent) to the first focal point 16. As a function of the angle of rotation of the first mirror surface 30*a* of the rotatable mirror 30, the beam of rays 5 hits the first system region 17 of the parabolic mirror 20 at different angles of incidence (and thus also at different locations of incidence). A ray which hits the parabolic mirror 20 through the first focal point 16 (main ray) is reflected by the first system region 17 of the parabolic mirror 20 in a direction which is constant and independent of the angle of incidence and the position of incidence of the ray, respectively, and a ray which does not run through the first focal point 16 (for example directly) is deviated at an angle relative to the main ray 6. A beam of rays 5 coming from the ray source 10 is thus reflected by the first system region 17 of the parabolic mirror 20 in such a way that it leaves the parabolic mirror 20 with a divergence which here is less than the divergence the beam of rays 5 has before hitting the first system region 17 of the parabolic mirror 20; in this respect, the divergence in other exemplary embodiments may however also be greater than the divergence before the imaging. In the case of a converging beam of rays 5, a focus 5*a* may be present at the point where rays of the beam of rays 5 reflected at an angle to the main ray 6 of the beam of rays 5 intersect, or a virtual focus 5*b* may be present at a point where the rays would intersect without any further influence on the beam of rays 5. Due to the different curvatures the parabolic mirror 20 may comprise, for example along its reflection face, the divergence of the beam of rays 5 reflected by means of the parabolic mirror 20 may depend on the point of impact of the beam of rays 5 onto the parabolic mirror 20. In the case of a beam of rays 5 imaged by the parabolic mirror 20 as a converging beam of rays 5, a (for example virtual) curved focal area 15*a/b* may arise, on which (virtual) foci 5*a* of the reflected beam of rays 5 may be present. A virtual focal area 15*b* is shown in FIG. 2 in a qualitative and schematic way using a broken line; in this respect, the focal area may also be formed in a different way, for example, the focal area 15*b* may comprise a curvature different from the curvature shown. According to the invention, a ray path may be chosen in the divergence-changing device 1 by means of rotation of the rotatable mirror 30 (and consequently of the first mirror surface 30*a*), which may correspond to the selection of a (for example virtual) focus 5*a/b* in the (for example virtual) focal area 15*a*/b.

A first ray-folding mirror 35 is provided which is configured and arranged in such a way that the beam of rays 5 reflected on the parabolic mirror 20 is incident on the first ray-folding mirror 35 and is deflected in such a way that it is emergent at an angle to the incident beam of rays 5. For example, the first ray-folding mirror 35 may be arranged in such a way that a main ray of the beam of rays 5 which is deflected to the second focal point of the parabolic mirror 20 by means of the parabolic mirror 20 and is incident on the first ray-folding mirror 35 is deflected at an angle of substantially approximately 90° to the incident main ray and, for example, all additional rays of the beam of rays 5 are deflected correspondingly in accordance with their respective angle of incidence.

According to this exemplary embodiment, a second ray-folding mirror 40 is provided which is configured and arranged in such a way that the beam of rays 5 deflected by means of the first ray-folding mirror 35 is incident on the second ray-folding mirror 40 and is deflected by means of the second ray-folding mirror 40. For example, the second ray-folding mirror 40 may be arranged and configured in such a way that the main ray 6 of a beam of rays 5 emergent from the second ray-folding mirror 40 is parallel to the main ray 6 of the beam of rays 5 hitting the first ray-folding mirror 35, and so that the ray emergent from the second ray-folding mirror 40 hits the parabolic mirror 20 again, for example the second system region 18 thereof.

The beam of rays 5 deflected by the second ray-folding mirror 40 which is incident on the second system region 18 of the parabolic mirror 20 is, in turn, imaged by the parabolic mirror 20, namely by the second system region 18 thereof. The beam of rays 5 is imaged in such a way that the main ray 6 of the beam of rays 5 which is incident on the parabolic mirror 20 from the second ray-folding mirror 40 is imaged by the second system region 18 of the parabolic mirror 20 onto the first focal point 16 of the parabolic mirror 20. The additional rays of the beam of rays 5 which are not parallel to the main ray 6 are imaged at an angle to the main ray imaged to the first focal point 16, whereby a divergence of the beam of rays 5 may be changed.

The beam of rays 5 reflected by the second system region 18 of the parabolic mirror 20 and the main ray of which is imaged onto the first focal point 16 is incident again on the first mirror surface 30a of the rotatable mirror 30 and is deflected thereby, so that it may leave the divergence-changing device 1 (see for example FIG. 3), wherein the main ray 6 of the beam of rays 5 is deflected from the first mirror surface 30a of the rotatable mirror 30, so that it lies on a (virtual) line which is independent of the angle of rotation of the rotatable rotational mirror 30.

When using a parabolic mirror 20 as the optical system 15, the divergence-changing device 1 may substantially be operated without any influence by chromatic errors and dispersion, since the beam of rays 5 is not led through a material in a transmissive way. In addition, non-linear optical influences may be avoided in the divergence-changing device 1, and the image field curvature (for example the properties of the (virtual) focal area 15a/b) may substantially be influenced exclusively by the geometrical properties and the reflection properties of the parabolic mirror 20, whereby a precise divergence change and the operation in connection with pulsed high-power ray sources may be possible.

Figure 4:
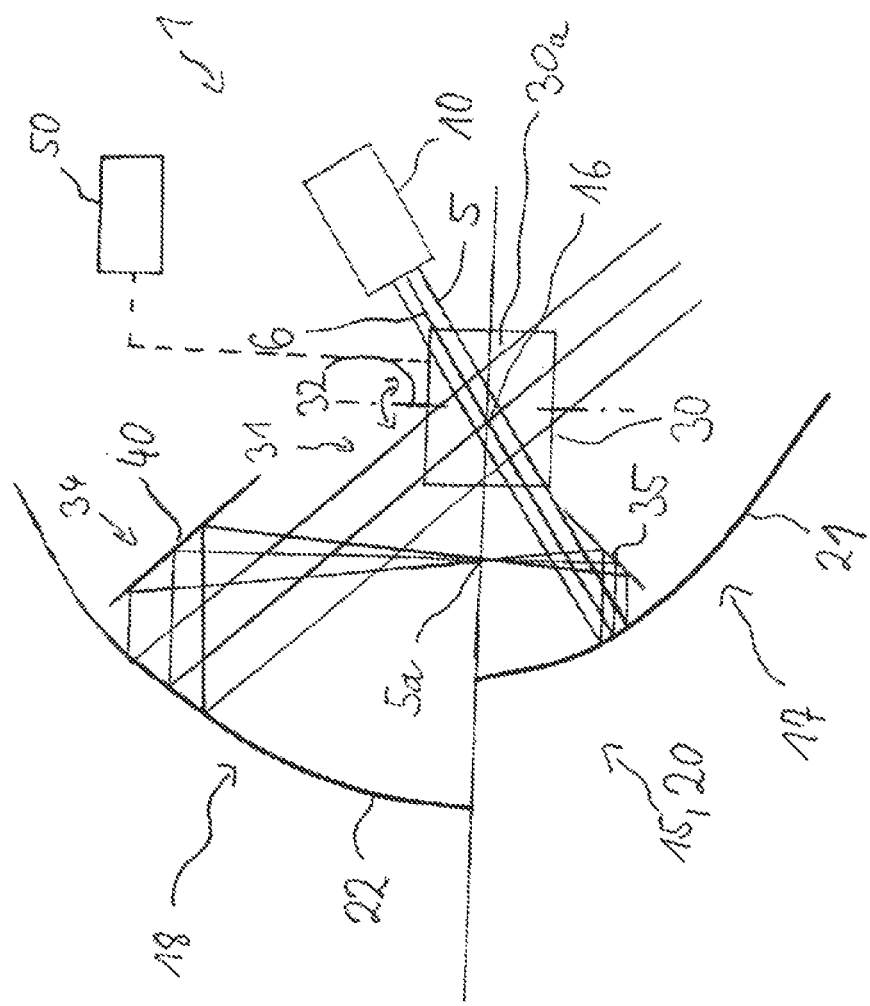
FIG. 4 schematically shows a divergence-changing device according to the present invention, in which a ray expansion functionality is integrated additionally.

With reference to FIG. 4, the optical system 15 may comprise a parabolic mirror 20 having several reflection faces 21, 22, for example having a first reflection face 21 as the first system region 17 and a second reflection face 22 as the second system region 18. The first 21 and/or the second 22 reflection face may be defined by different paraboloid functions, i.e. they may be defined by functions with different paraboloid parameters and/or different exponents. The exponent may, for example, substantially take the value of 2 or may, for example, take a value in the range of about 1.8 to about 2.2. The first reflection face 21 may have a first reflection face focal point and the second reflection face 22 may have a second reflection face focal point. The first 21 and the second 22 reflection faces may be arranged in such a way that their peaks lie in one point or are arranged at different points. As shown in FIG. 4, the first 21 and the second 22 reflection faces may be arranged in such a way that their respective focal points, i.e. the first reflection face focal point and the second reflection face focal point converge and together form the first focal point 16 of the optical system 15. The components of the divergence-changing device 1 are arranged in such a way according to FIG. 4 that the beam of rays 5 hits the first reflection face 21 (i.e. the first system region 17) from the first mirror surface 30 of the rotatable mirror 30 and that the beam of rays 5 hits the second reflection face 22 (i.e. the second system region 18) after deflection by the first 35 and second 40 ray-folding mirrors. As shown in FIG. 4, an expansion (increase) or reduction (decrease) of the diameter of the beam of rays 5 may be achieved in addition to a divergence change, for example by a different selection of parameters and/or exponents of the two functions defining the first reflection face 21 and the second reflection face 22. If, for example, a greater value is chosen for the parabola parameter of the function defining the first reflection face 21 (the parabola parameter is, for example, a constant which is multiplied by a variable which is substantially raised to the power of 2 and forms part of a function that describes a paraboloid) than for the parabola parameter of the function that defines the second reflection face 22, an expansion of the diameter of the beam of rays 5 coming from the ray source 10 may be achieved. If, for example, a smaller value is chosen for the parabola parameter of the function that defines the first reflection face 21 than for the parabola parameter of the function that defines the second reflection face 22, a reduction of the diameter of the beam of rays 5 coming from the ray source 10 may be achieved. For a more efficient ray expansion and divergence-changing, the first ray-folding mirror 35 may be different in size than the second ray-folding mirror 40, for example, the second ray-folding mirror 40 may have a mirror surface greater in size than that of the first ray-folding mirror 35 or vice versa. Of course, the same divergence-changing device 1 which is configured as described above may enable both an expansion and a reduction of the diameter of a beam of rays 5 by directing the beam of rays 5 by means of the ray-deflecting device 30 either first onto the first reflection face 21 or by directing it first onto the second reflection face 22 (in this case, the further ray path of the beam of rays 5 is then reversed with respect to the one described above). Hence, a ray expansion functionality and a ray reduction functionality, respectively (with respect to a cross-sectional area of the beam of rays 5) with a fixed relationship of the change of cross-section of the beam of rays 5 may be provided in addition to the divergence-changing functionality according to the invention.

Although only an optical system 15 configured as a reflective system having a parabolic mirror 20, having a first 17 and a second system region 18 with different optical properties is described by means of FIG. 4, also an optical system 15 configured as a transmissive refraction system 25 may comprise a first and a second system region 17, 18 which have different optical properties. For example, the refraction system 25 may comprise a first lens system and a second lens system (for example respectively having one or more lenses) which may form the first system region 17 and the second system region 18, respectively, and may have a first lens system focal point and a second lens system focal point, respectively. The first lens system may have other optical properties than the second lens system or the first and the second lens system may have the same optical properties. The first lens system focal point may coincide with the second lens system focal point, so that they form the first focal point 16 of the optical system 15 together.

Figure 5:
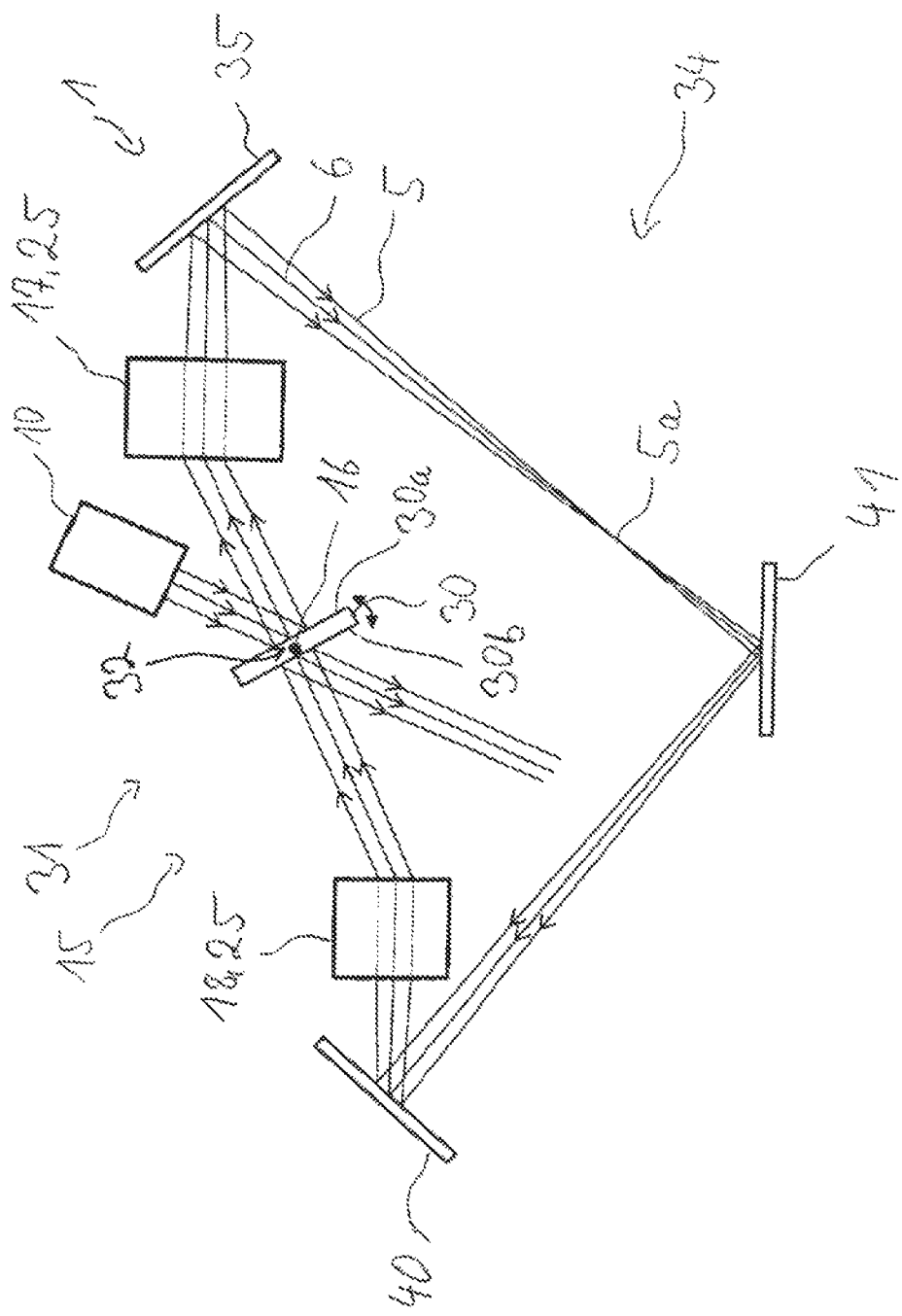
FIG. 5 schematically shows a divergence-changing device according to the present invention in accordance with another exemplary embodiment.

FIG. 5 shows another exemplary embodiment of a divergence-changing device 1. According to FIG. 5, the ray-deflecting device 30 is formed as a rotatable double mirror 30. The rotatable double mirror 30 comprises a first, for example substantially plane mirror surface 30a and a second, for example substantially plane mirror surface 30b, a surface normal of the first mirror surface 30a having a component which is substantially opposed to a component of a surface normal of the second mirror surface 30b. For example, the first mirror surface 30a may be arranged parallel to the second mirror surface 30b. The optical system is configured as a transmissive refraction system 25, the first system region 17 and the second system region 18 being arranged to be physically distant from each other, and a focal point of the first system region 17 and a focal point of the second system region 18 coinciding and together forming the first focal point 16 of the optical system 15. According to FIG. 5, the first focal point 16 of the optical system 15 is formed between the first system region 17 and the second system region 18, and the rotatable double mirror 30 is arranged in such a way that both the first mirror surface 30a and at the same time the second mirror surface 30b are arranged in or close to the first focal point 16 and between the first system region 17 and the second system region 18. The ray-folding device 34 comprises a first ray-folding mirror 35, a second ray-folding mirror 40 and a ray-folding intermediate mirror 41 (however, it may also comprise further ray-folding intermediate mirrors 41). According to FIG. 5, the divergence-changing device 1 is configured in such a way that the main ray 6 of the beam of rays 5 originating from the ray source 10 hits the first mirror surface 30*a* of the double mirror 30 in or close to the first focal point 16 of the optical system 15, and the additional rays hit the first mirror surface 30*a*. The beam of rays 5 may be supplied to the first system region 17 by means of the rotatable double mirror 30 (and the first mirror surface 30*a* thereof, respectively) according to an angle of rotation of the double mirror 30 at a different angle (and at a different position), the beam of rays 5 being imaged by the first system region 17 as described above in a telecentric way with a divergence change. The beam of rays 5 imaged by the first system region 17 hits the first ray-folding mirror 35 and is deflected thereby to the ray-folding intermediate mirror 41. The ray-folding intermediate mirror 41 deflects the beam of rays 5 to the second ray-folding mirror 40. The ray-folding intermediate mirror 41 may have the same (optical) properties as the above-described first 35 or second 40 ray-folding mirror. The beam of rays 5 is deflected to the second system region 18 of the optical system 15 by the second ray-folding mirror 40, and is imaged by the second system region 18 as described above in such a way that the main ray 6 of the beam of rays 5 hits the second mirror surface 30*b* of the rotatable double mirror 30 in or close to the first focal point 16, and the additional rays also hit the second mirror surface 30*b* (for example in part). The beam of rays 5 is deflected by the second mirror surface 30*b* in such a way that the main ray 6 of the beam of rays 5 has a substantially constant position which is independent of the angle of rotation of the rotatable double mirror 30. As shown in FIG. 5, the beam of rays 5 hitting the first mirror surface 30*a* from the ray source 10 and the beam of rays 5 hitting the second mirror surface 30*b* from the second system region 18 are physically separated. If the double mirror 30 and the first mirror surface 30*a* and the second mirror surface 30*b*, respectively, are arranged correspondingly, the beams of rays 5 may be collinear with respect to each other (for example if the first and second mirror surfaces 30*a*, 30*b* are arranged parallel to each other and at the same distance from the first focal point 16 (not shown)). In FIG. 5, a focus 5*a* is shown which is formed between the first ray-folding mirror 35 and the ray-folding intermediate mirror 41. As described above, a focus 5*a* may also appear at another location, or no point-shaped focus 5*a* may occur within the divergence-changing device 1, for example if the first and/or second ray-folding mirrors 35, 40 and/or the ray-folding intermediate mirror 41 are provided with a cylindrical imaging property or lenses having a cylindrical refraction power are additionally provided. Although the components of the divergence-changing device 1 are shown in FIG. 5 as lying in one plane, the components may be arranged to be offset spatially in a three-dimensional way with respect to each other. For example, the first and/or second ray-folding mirrors 35, 40 and/or the ray-folding intermediate mirror 41 may be arranged above or below the plane of FIG. 5, so that, for example, the beam of rays 5 deflected by the second mirror surface 30*b* may be passed "above" or "below" a ray-folding mirror (and a ray-folding intermediate mirror, respectively, or another component of the divergence-changing device 1), if the mirrors of the ray-folding device 34 are spatially aligned to each other and to the optical system 15 (not shown).

According to the invention, divergence-changing devices 1 having two system regions 17, 18 with different optical properties are not limited to embodiments with a rotatable mirror 30 or a rotatable double mirror 30 as the ray-deflecting device 30 and/or a first 35 and second 40 ray-folding mirrors as the ray-folding device 34, but also may comprise other ray-deflecting devices 30 or ray-folding devices 34.

According to the invention, an optical system 15 and a ray-deflecting device 30 may be used for an imaging two times over of a beam of rays 5. Thereby, the divergence-changing device 1 according to the invention is insusceptible to drift effects of the ray-deflecting device 30 with respect to the direction of propagation of the leaving beam of rays and is less prone to errors, as the ray-deflecting device 30 may be the only component part exposed to mechanical stress.

Only one ray-deflecting device 30 is necessary for changing the divergence (for example for focusing) of a beam of rays 5 due to the folding of the optical structure according to the invention, whereby drift effects, thermal effects, deviations and tolerances may be minimized and a divergence may be set with high precision and high directional stability of the ray propagation as well as at high speed. According to the invention, only one optical system 15 is necessary, whereby production costs for the divergence-changing device 1 may be reduced. For example, a very high speed may be achievable by using a rotatable mirror 30 (or double mirror 30) as the ray-deflecting device 34 when setting the divergence, since only a low mass of the rotatable mirror 30 has to be moved and the main rays always pass a point near the center of the mirror according to the invention, whereby its surface size and moment of inertia may be minimized. By the imaging of the beam of rays 5 two times over at only one optical system 15, systematic deviations and errors that might occur in the optical system 15 may be compensated by the imaging two times over. Another advantage of the divergence-changing device 1 according to the present invention is that the divergence-changing device may be configured effectively in a gas-proof way due to the structure including a ray-deflecting device 30 and an optical system 15 (for example, the divergence-changing device may comprise a gas-proof housing for this purpose). Thereby, the divergence-changing device 1 may be operated being evacuated or filled with an optically substantially inert gas, so that a perturbing interaction between an ambient medium, such as air, and the ray path (for example focus 5*a*) may be avoided in the divergence-changing device 1. Likewise, a perturbing interaction between the beam of rays 5 and a component of the divergence-changing device 1 may be avoided or reduced, if no actual focus 5*a* appears in the divergence-changing device 1 but, for example, only a virtual focus 5*b* or focus line. In addition, the structure of the divergence-changing device 1 according to the invention allows an efficient cooling, as the components (for example the reflection system 20) of the divergence-changing device 1 can be reached easily by a cooling device due to the simple structure.

According to the invention, the divergence-changing device 1 may be used with a 2-D scanning system as it is, for example, used for material processing. A 2-D scanning system may, for example, be provided with one or two ray-deflecting devices which can deflect the beam of rays 5 respectively in two spatial directions independent of each other. Thereby, the divergence of a beam of rays 5 can be adjustable by means of the divergence-changing device 1, while the direction of propagation of the beam of rays 5 is additionally adjustable by means of the 2-D scanning system. Thereby, for example, potential deviations of the direction of propagation of the beam of rays 5 may be balanced by means of the 2-D scanning system (for example using correction tables stored in a controller). Accordingly, the divergence-changing device 1 may be arranged in the ray path before the 2-D scanning system, so that the beam of rays may hit the 2-D scanning system depending on the ray-deflecting device 30 with a different divergence (which may correspond to a different distance between a working focus and a ray source) and is deflectable by the 2-D scanning system in two spatial directions independent of each other. Thereby, for example, the beam of rays 5 may be directed across a work piece surface and different distances between the ray source and points on the work piece surface may be compensated by the divergence-changing device 1. For this purpose, a controller may be provided which may be connected both to the 2-D scanning system and to the divergence-changing device 1 (and to the ray-deflecting device 30 thereof, respectively), so as to control it.

The controller may control the first ray-deflecting device 30 (and the divergence-changing realized thereby, respectively) according to a target divergence-changing value. In this respect, the target divergence-changing value corresponds to a desired divergence and/or a desired divergence change and may be provided to the controller, for example by a user input or by another control device, computer, process automation controller or the like. The target divergence-changing value may also correspond to the distance of a working focus from the ray source 10, as this distance may depend on the divergence of the beam of rays 5. The target divergence-changing value may be calculated by the controller using an algorithm and data stored in the controller. At the same time, the controller may be configured in such a way that it controls the 2-D scanning system according to a target ray position and direction value. The target ray position and direction value may, in this respect, correspond to a desired position and direction of the beam of rays 5 emergent from the 2-D scanning system. The target ray position and direction value may be provided to the controller, for example by a user input or by another control device, computer, process automation controller or the like. This means that the controller may control the divergence-changing device 1 in such a way that a divergence change is freely selectable and adjustable and that, at the same time, the position and direction of a beam of rays 5 emergent from the 2-D scanning system is freely selectable and adjustable.

The target divergence value may be selected/calculated/stored in such a way that a (working) focus is provided outside the divergence-changing device 1 (for example on the surface of a work piece), so that the focus is, for example, always formed directly on the work piece surface and hits the work piece surface with a predetermined cross-section independent of a change of the ray path length between a ray source 10 and the position where the beam of rays 5 hits the work piece (and the work piece surface, respectively).

According to the invention, for example a geometry of a work piece may be stored in the controller in the form of point coordinates (for example x, y, z) and lines extending between point coordinates, and a processing plan may be stored in the controller at the same time, which includes information as to at which coordinates a beam of rays 5 should hit the work piece with which divergence (and with which beam diameter, respectively). (The processing plan may also contain further and/or other information, such as the period of time during which a beam of rays 5 should act on a point, a performance requirement regarding the ray source 10 or the like). The controller may then calculate a target divergence-changing value (and more, respectively) from the geometry of the work piece and the processing plan, and at the same time a target ray position and direction value (and more, respectively) and may control the divergence-changing device 1 and the 2-D scanning system in such a way that the processing plan is fulfilled.

The controller may also be connected to other components, so as to control them, for example to the ray source 10 or a blind and a "pulse picker", respectively, for a short interruption of the ray path between the ray source 10 and a work piece, or to other ray-deflecting devices.

In other words, the controller may process 3-D coordinates and may convert these coordinates, for example by means of coordinate transformations and correction tables into control values for the divergence-changing device 1 and the optionally provided 2-D ray-deflecting system, and may then control the divergence change and the direction of propagation of the beam of rays 5 correspondingly.

According to the invention, keeping the direction and the position of the main ray 6 of the beam of rays 5 emergent from the divergence-changing device 1 constant (and keeping them stationary, respectively) is obtained by means of generating a difference of the imaging angles in the ray path of the divergence-changing device 1, wherein the "sum" of the imaging angles in the ray path remains constant, taking into account the sense of rotation (i.e. the sign) between a first imaging on the ray-deflecting device 30 and a second imaging on the ray-deflecting device 30 after an imaging by means of the optical system 15 independent of a setting/position of the ray-deflecting device 30. This means that a, for example, positive change of the angle of deflection of the ray-deflecting device 30 is compensated in the ray path of the divergence-changing device 1 according to the invention by addition of the same negative change (calculation of difference) and vice versa, so that the total sum of the angles remains constant.

Hereinafter, it is further described how this process of keeping the main ray 6 of the emergent beam of rays 5 stationary according to the invention is achieved despite a divergence change.

The axis of rotation 32 (see FIGS. 1a, 2, 3, 4, 5, 7 and 8) of the ray-deflecting device 30 is an axis about which a beam of rays 5 hitting the ray-deflecting device 30 is imaged in a rotational and pivotal way, respectively (relating to the direction of propagation of the main ray 6 before and after the imaging). In the Figures, this is, for example, the axis of rotation 32 of the rotational mirror 30. In addition, the divergence-changing of the beam of rays 5 is achieved according to the invention as described above by telecentric imaging at the first system region 17 and the functionally reversed telecentric imaging at the second system region 18 of the divergence-changing device 1 according to the invention; in this respect, the ratio of the distance of the (for example virtual) focus 5a/b (see, for example, FIG. 1) in the ray path from leaving the first system region 17 to the distance of this focus 5a in the ray path until hitting the second system region 18 changes. This asymmetry of the distance of the focus 5a/b from the first system region 17 and to the second system region 18 may (for example with an equally formed first and second system regions 17, 18) result in a divergence change.

The fact that the beam of rays 5 emergent from the divergence-changing device 1 is substantially stationary with respect to the main ray 6 and independent of a divergence change is, for example in the embodiments shown in FIGS. 1 to 4 and 7 (described in more detail below) achieved by the axis of rotation 32 of the ray-deflecting device 30 being, according to the invention, substantially parallel to the plane spanned by the main ray 6 of the beam of rays 5 in the section following the (first) imaging by means of the optical system 15 (at the first system region 17 thereof) until hitting the optical system 15 (at the second system region 18 thereof) again (folding plane). This folding plane is shifted by a change in the angle of deflection generated by means of the ray-deflecting device 30, for example in the embodiments shown in FIGS. 1 to 4 and 7, in a vertical parallel way (i.e. shifted along the surface normal of the folding plane), thus resulting in a three-dimensional ray-guidance in case of a divergence change accompanied by an angle of deflection change (change from a first divergence to a different, second divergence) of the beam of rays 5. This means that the folding plane of the beam of rays 5 comprising the first divergence after leaving the divergence-changing device 1 is shifted in a vertical parallel way with respect to the folding plane of the beam of rays 5 comprising the second divergence after leaving the divergence-changing device 1.

In other words, the folding plane is shifted in a vertical parallel way by an angle of deflection change generated by means of the ray-deflecting device 30, for example in the embodiments shown in FIGS. 1 to 4 and 7. This shift in the ray guidance to be considered in a three-dimensional way leads to a change in the above-mentioned distance relation of the focus 5a/b from the first and second system region 17, 18, respectively, and thus to a divergence change of the beam of rays 5 (change from a first divergence to a different, second divergence).

This means that the folding plane of the beam of rays 5 comprising the first divergence after leaving the divergence-changing device 1 is shifted in a vertical parallel way to the folding plane of the beam of rays 5 comprising the second divergence after leaving the divergence-changing device 1.

The location of all possible (as the case may be virtual) foci 5a/b obtained by this substantially vertical parallel shift of the folding plane with a simultaneous shifting of the focus 5a/b within the folding planes may define, as described above, for example the (as the case may be virtual) focal surface 15a/b. The vertical parallel shift of the folding planes results in the aforementioned three-dimensional ray guidance in the divergence-changing device 1 and results in a main ray 6 of the beam of rays 5 emergent from the divergence-changing device 1 which is stationary despite a divergence change. In other words, the main ray 6 of the beam of rays 5 emergent from the ray-deflecting device can be held stationary by the three-dimensional ray guidance according to the invention despite the (vertical) parallel shift of the folding plane.

FIG. 1a shows a top view of the folding plane. It can be seen that the main ray 6 extends in a plane, i.e. the folding plane in the section after leaving the first system region 17 and before entering the second system region 18 (and thus also between the first ray-folding mirror and the second ray-folding mirror 35, 40). FIG. 1b, which shows a side view of the folding plane, illustrates that this folding plane is shifted in a (vertical) parallel way in case of a divergence change transverse to the axis of rotation 32 of the rotational mirror 30.

FIGS. 2 and 4 also show a top view of the respective folding plane which is spanned in the section of the ray path extending between the point of emergence of the main ray 6 from the first system region 17 and the entry point of the main ray 6 into the second system region 18. FIGS. 2 and 4 also illustrate that the axis of rotation 32 of the ray-deflecting device 30 is parallel to the folding plane; in this respect, the parallelism between the plane and an axis expresses herein that the axis either never intersects the plane or, optionally, completely lies in the plane.

FIG. 3 also shows the axis of rotation 32 of the ray-deflecting device 30 (which here corresponds to the axis of rotation 32 of the rotational mirror 30) which is (substantially) parallel to the folding plane and to the main ray 6 of the beam of rays, respectively, in the section of the ray path between the first ray-folding mirror 35 and the second ray-folding mirror 40 (wherein this section lies in the folding plane).

In the embodiment of FIG. 5, the axis of rotation 32 of the ray-deflecting device 30 (here that of the rotational mirror 30) is perpendicular to the folding plane (for example at least between leaving the first system region 17 and hitting the first ray-folding mirror 35, if no further optical components are arranged between the first system region 17 and the first ray-folding mirror 35). In the embodiment according to FIG. 5, the beam of rays 5 imaged by the ray-deflecting device 30 (here by the second mirror surface 30b) is held in a stationary way with respect to the main ray 6 by using two opposing mirror surfaces 30a/b oriented in an opposite way, which are, for example, parallel to each other, which results in the above-mentioned generation of a difference.

Figure 6:
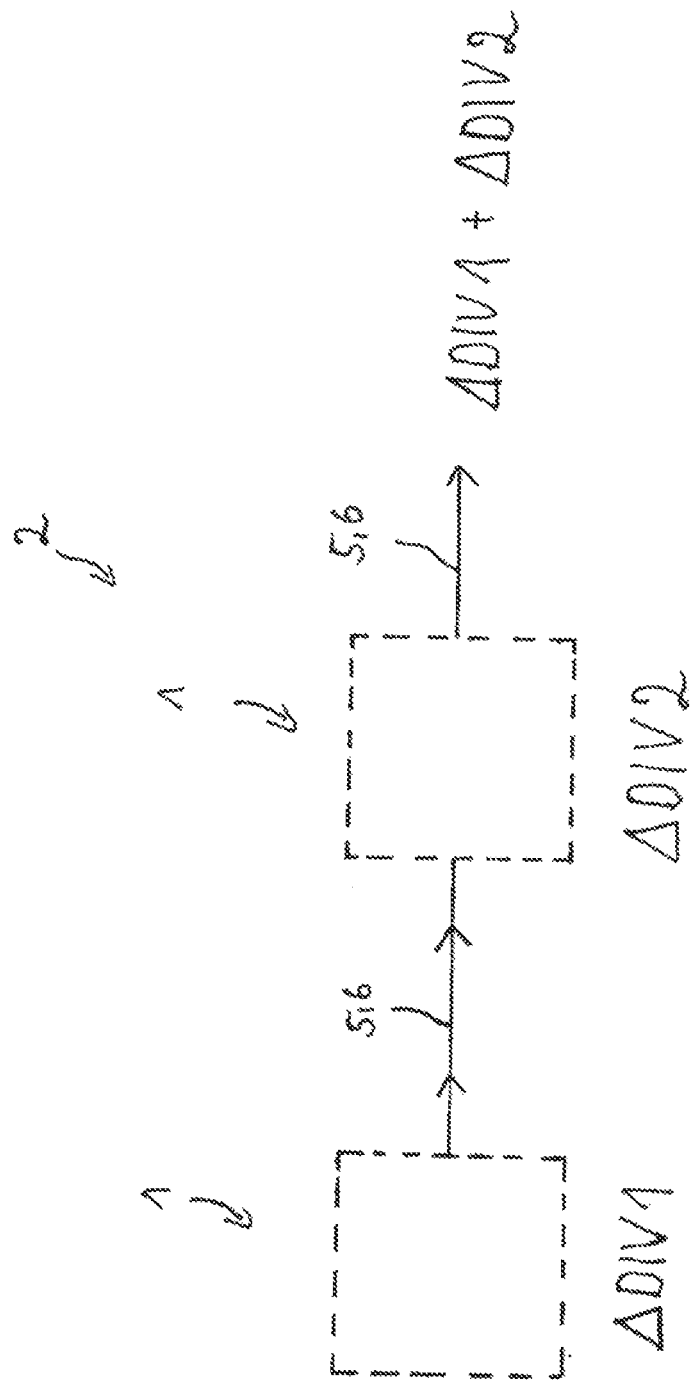
FIG. 6 schematically shows a divergence-changing device arrangement comprising two divergence-changing devices according to the invention.

With respect to FIG. 6, it is, due to the despite a divergence change constant direction and position of the beam of rays 5 (i.e. the main ray 6 thereof) emergent from a divergence-changing device 1 efficiently possible to arrange a plurality of divergence-changing devices 1, for example two, three, four or any number in such a way that a beam of rays 5 emergent from a divergence-changing device 1 hits another divergence-changing device 1 in such a way that this beam of rays hits the ray-deflecting device 30 of this other divergence-changing device 1 in or close to the first focal point 16, etc. Thereby, two or more divergence-changing devices 1 may be arranged optically "in series" with respect to an ray path formed by these two or more divergence-changing devices together, so that they form a divergence-changing arrangement 2 as shown in FIG. 6, and so that the divergence of a beam of rays 5 running through this divergence-changing arrangement 2 and the exactly two or more divergence-changing devices 1, respectively, by which the divergence-changing arrangement 2 is implemented, may be changed gradually or progressively; in this respect, the total divergence change that may be generated in the common ray path may, however, be adjustable in a continuous (for example stageless) way.

According to FIG. 6, two divergence-changing devices 1 are arranged in a common ray path (schematically shown; in this respect, each divergence-changing device 1 described herein may be used) in such a way that they form a divergence-changing arrangement 2, wherein a first, upstream divergence-changing device 1 (on the left-hand side in FIG. 6) generates the divergence change "ΔDIV1" and a second divergence-changing device 1 downstream of the first divergence-changing device generates the divergence change "ΔDIV2". The beam of rays 5 running through the common ray path (in FIG. 6 represented by the main ray 6 thereof) is thus first subject to the divergence change "ΔDIV1" (which may be any divergence change) and is then subject to the divergence change "ΔDIV2" (which may also be any divergence change, wherein both divergence changes may have the same algebraic sign), so that the beam of rays 5 leaving the divergence-changing arrangement 2 is altogether subject to the divergence change ΔDIV1+ΔDIV2.

In other words, the ray source 10 of a divergence-changing device 1 which is arranged in the common ray path in a direction of propagation of the beam of rays 5 after or following another divergence-changing device 1 may be implemented by the beam of rays 5 emergent from this other divergence-changing device 1 in a divergence-changing arrangement 2.

In a divergence-changing arrangement 2, all divergence-changing devices 1 may be of the same type (for example with a transmissive or reflective optical system 15) or may be of a different type (i.e. all embodiments described above and also below having a retroreflector device 60 may be operated together and may form a common ray path for the divergence-changing of a beam of rays 5) with reference to the Figures. The divergence-changing devices 1 of the divergence-changing arrangement 2 are therefore schematically shown by a broken line in FIG. 6 for the purpose of clarification.

The divergence-changing devices 1 of a divergence-changing arrangement 2 may have the same geometrical dimensions or may have different geometrical dimensions. If, for example, the divergence of a beam of rays 5 provided by a ray source 10 is to be reduced mainly, the divergence-changing device 1 following a divergence-changing device 1 in the common ray path may, for example, be provided to be smaller (i.e. with reduced dimensions) if it is to be expected on normal operating conditions that due to the divergence-changing device 1 arranged in the ray path before, the divergence (and thus, for example, also the diameter of the beam of rays) of the beam of rays 5 is already reduced. Inversely, the divergence-changing devices 1 may be provided along the common ray path with a respectively increasing size as well, if the divergence of a beam of rays 5 is to be, for example, mainly increased by means of a divergence-changing arrangement 2.

Besides, further optical elements may be arranged between the divergence-changing devices 1 of a divergence-changing arrangement 2, for example in order to change (for example to increase or to reduce) the ray cross-section of the beam of rays 5 passing through the common ray path or in order to manipulate the beam of rays 5 in another way.

According to the invention, also the sequential arrangement of a conventional divergence-changing device (for example comprising shiftable lenses) and a divergence-changing device 1 according to the invention is possible, so that they form a divergence-changing arrangement 2. This may, for example, make sense, in order to add together or to combine a highly dynamic (for example fast) divergence change with a lower divergence amount (for example a lower/small divergence change) and a comparatively slower divergence change with a greater divergence amount (for example a greater/stronger divergence change).

Figure 7:
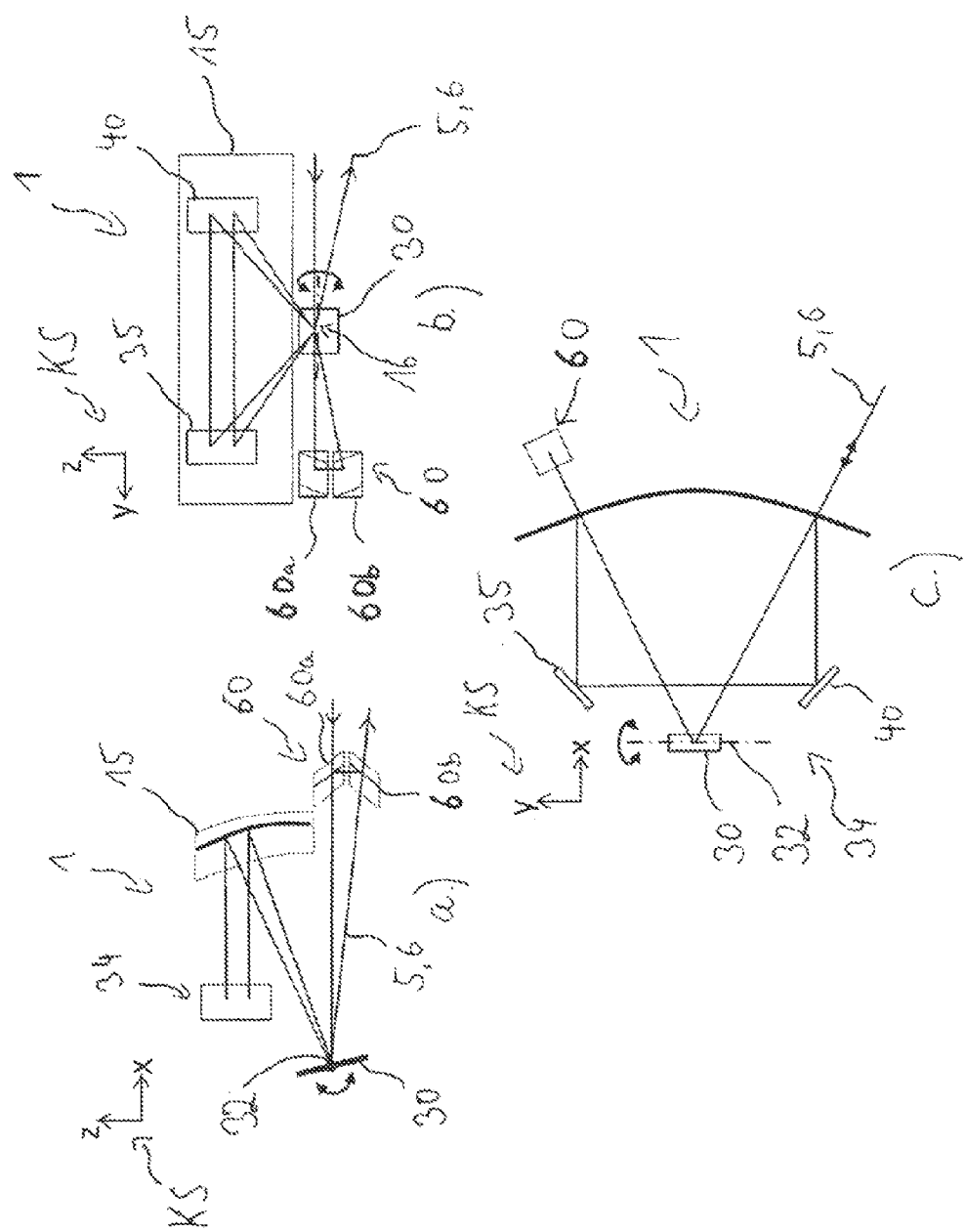
FIG. 7 schematically shows a divergence-changing device having a retroreflector device according to the present invention, which may be provided with each embodiment of the divergence-changing device.

FIG. 7 shows three different views a.), b.), and c.) of a divergence-changing device 1, wherein the three views are characterized by the axes X, Y, Z of the Cartesian coordinate system. In FIG. 7, the beam of rays 5 is represented by the mean ray 6 thereof and the direction of propagation of the beam of rays 5 and that of the main ray 6, respectively, is symbolized by arrows.

The above-described three-dimensional ray guidance within the divergence-changing device 1 is once again illustrated by FIG. 7 as well, by means of views a.), b.), and c.).

The components of the divergence-changing device 1 correspond to the components described above, for example with reference to FIGS. 2 and 3, and the divergence-changing device 1 further comprises an optional folding arrangement 60 and a retroreflector device 60 (hereinafter referred to as retroreflector device), respectively.

The retroreflector device 60 is configured and arranged in such a way that it re-images the beam of rays 5 emergent from the ray-deflecting device 30 after an imaging at least two times over by means of the optical system 15 (in a divergence-changing device 1) onto the optical ray-deflecting device 30 in such a way that the main ray 6 of this re-imaged beam of rays hits the first ray-deflecting device 30 again in or close to the first focal point 16, and also the additional rays (or a part thereof) of the beam of rays 5 hit the ray-deflecting device 30 again. This re-imaging by means of the retroreflector device 60 results in that the re-imaged beam of rays 5 passes through the divergence-changing device 1 again/once again like a beam of rays 5 coming from the ray source 10, whereby a divergence change increase may be achieved.

The efficient use of the retroreflector device 60 is possible, as the beam of rays 5 emergent from the ray-deflecting device 30 is stationary and has a direction and position that is independent of a divergence change. Therefore, it is efficiently possible to re-image or redirect the emergent beam of rays in such a way that it hits the ray-deflecting device 30 again in or close to the first focal point 16 and may pass through the divergence-changing device 1 again/once again, optionally thereby increasing a divergence change.

Figure 8:
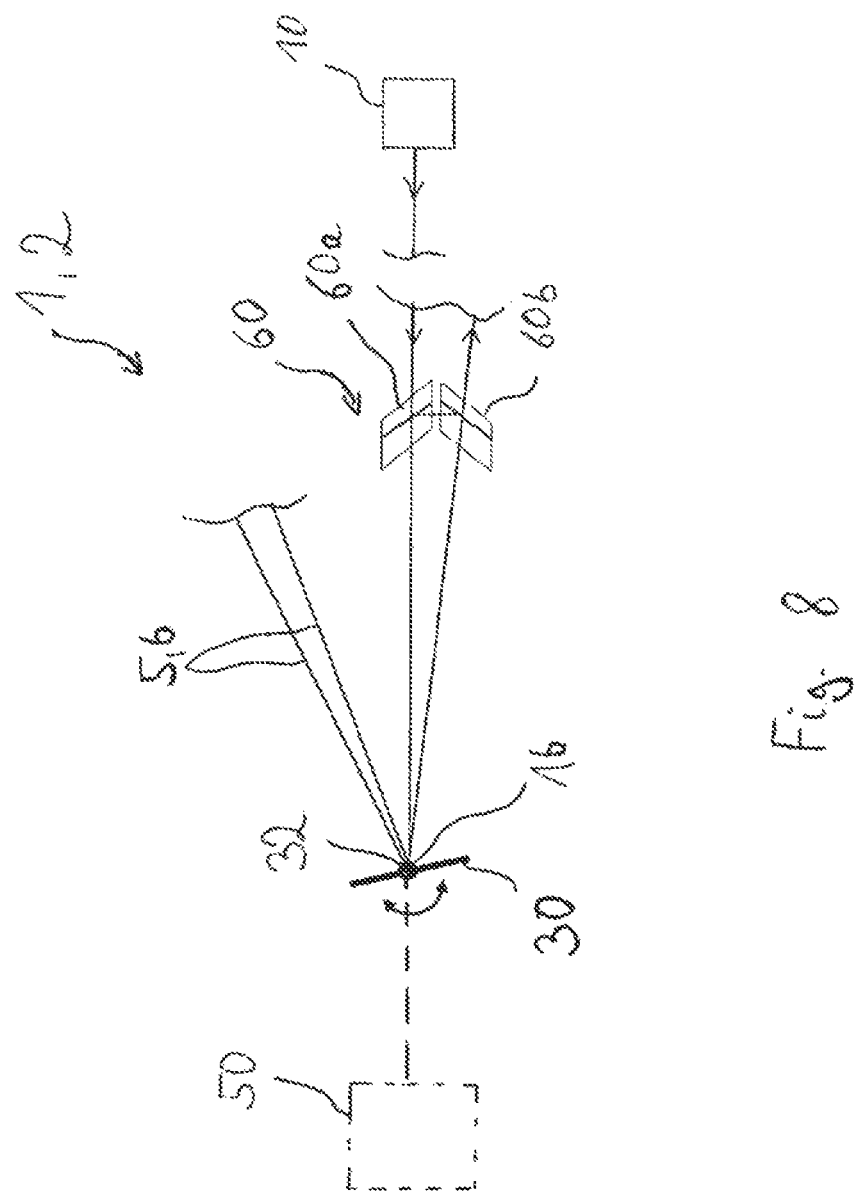
FIG. 8 shows a schematic view of a divergence-changing device or divergence-changing arrangement and a retroreflector device according to the invention.

FIG. 8 shows a schematic partial view of a divergence-changing device 1 and a divergence-changing arrangement 1 having a retroreflector device 60, respectively. The ray path of the beam of rays 5 represented by the main ray 6 thereof between the ray-deflecting device 30 and the retroreflector device 60 in FIG. 8 corresponds to the ray path shown in FIGS. 7a.) to c.). The ray-deflecting device 30 shown in FIG. 8 is, for example, the ray-deflecting device 30 of one of the divergence-changing devices 1 shown in FIGS. 1 to 7 or that of a divergence-changing device 1 of a divergence-changing arrangement 2. FIG. 8 shows (like FIG. 7a) a two-dimensional projection of the actually three-dimensional ray path (cf. FIGS. 7a.), b.) and c.)), wherein, in the view according to FIG. 8, the beam of rays 5 coming from the ray source 10 of the divergence-changing device 1 (and the divergence-changing arrangement 2, respectively) and the beam of rays 5 emergent from the divergence-changing device 1 extend in a plane above or below the retroreflector device 60. In the view of FIG. 8, the beam of rays 5 hitting the retroreflector device 60 from the ray-deflecting device 30 and the beam of rays 5 hitting the ray-deflecting device 30 (again/once again) from the retroreflector device 60 are covered by the beam of rays 5 coming from the ray source 10 and the beam of rays 5 emergent from the divergence-changing device 1; in this respect, please note again that the ray source 10 may also be implemented by means of the stationary beam of rays 5 emergent from another divergence-changing device 1.

As shown in FIGS. 7 and 8, the retroreflector device 60 may be formed by means of two mirrors 60a, 60b, wherein the first mirror 60a may be arranged and configured in such a way that the beam of rays 5 deflected by the ray-deflecting device 30 for the second time hits the first mirror 60a and is imaged onto the second mirror 60b by the same. The second mirror 60b may be configured and arranged in such a way that the beam of rays 5 incident from the second mirror 60a to the second mirror 60b is re-imaged onto the ray-deflecting device 30 by means of the second mirror 60b in such a way that the main ray 6 thereof hits the ray-deflecting device 30 again in or close to the first focal point 16, and so that at least a part of the additional rays hits the ray-deflecting device 30 again.

The retroreflector device 60 may be configured and arranged in such a way that it images the beam of rays 5 which, coming therefrom, hits the ray-deflecting device 30 again, in such a way that it hits the ray-deflecting device 30 at an angle that is different from the angle at which the beam of rays 5 hitting the retroreflector device 60 from the ray-deflecting device 30 is imaged (in a stationary way) by means of the ray-deflecting device 30.

This may, for example, be realized in that the point on the first mirror 60a at which the main ray 6 of the beam of rays 5 coming from the ray-deflecting device 30 hits the first mirror 60a is at a physical distance from the point on the second mirror 60b at which the main ray 6 of the beam of rays 5 coming from the first mirror 60a hits the second mirror 60b.

The retroreflector device 60 (for example the first mirror 60a and the second mirror 60b thereof) may therefore be configured in such a way that the beam of rays 5 coming from the ray-deflecting device 30 and incident on the retroreflector device 60 and the beam of rays 5 emergent from the retroreflector device 60 again are physically separated from each other, as it is shown in FIGS. 7 and 8 (physical separation at least with respect to the main ray 6 and except for the first focal point 16 and/or an area close thereto, where/in which the beams of ray 5 may intersect).

The different angles (for example related to the ray-deflecting device 30) of the main ray 6 hitting the retroreflector device 60 from the ray-deflecting device 30 and of the main ray 6 hitting the ray-deflecting device 30 again/once again from the retroreflector device 60 and the physical distance of these main rays 6 may result in that the beam of rays 5 hitting the optical system 15 from the retroreflector device 60 through the ray-deflecting device 30 is physically separated from the beam of rays 5 which hits the optical system 15 coming from the ray source 10 through the ray-deflecting device 30 at least with respect to the main ray 6, so that, according to the invention, no separate device is necessary for the separation of rays of the beam of rays 5 incident in and emergent from the divergence-changing device 1.

This physical separation of a beam of rays 5 incident on and emergent from the divergence-changing device 1 makes it possible to do without a polarization-optical separation of rays, wherein, however, according to the invention, also a collinear redirection of the beam of rays 5 (for example by means of a retroreflector device 60 that consists of a single mirror) and a polarization-optical separation of incident and emergent beams of rays 5 may be used, if it is required in a specific case of application.

In the embodiments described above (see, for example, FIGS. 7 and 8), the divergence-changing device 1 is passed through twice, wherein, however, due to the respectively stationary output beam of rays according to the invention also a passing through the same divergence-changing device 1 three times, four times, five times or n times may be achieved by providing corresponding retroreflector devices.

By means of the passing through the divergence-changing device 1, the divergence change that is obtained by means of a divergence-changing device 1 may be increased when compared to passing through the divergence-changing device 1 only one time with the same setting of the ray-deflecting device 30. Thus, in order to achieve the same divergence change, a smaller angle of deflection of the ray-deflecting device 30 is required in case of a multiple passing, and for setting the divergence change, a smaller angle of deflection change is required. This may have an advantageous effect on the achievable possible speed of the variation/setting of the divergence change.

Although FIG. 7 shows a divergence-changing device 1 comprising an optical system 15 formed as a reflection system 20, also the divergence-changing devices 1 comprising a transmissive refraction system 25 and/or a ray-deflecting device 30 with two mirror surfaces 30*a*, 30*b* (cf. FIGS. 1*a/b*, FIG. 5) may be provided with the retroreflector device 60 as it is schematically shown in FIG. 8, as it is a feature of each divergence-changing device 1 and divergence-changing arrangement 2 according to the invention that a beam of rays 5 emergent therefrom is substantially stationary with respect to the main ray 6 thereof, i.e. substantially has a constant direction and position.

Two or more divergence-changing devices 1 comprising a retroreflector device 60 may be arranged as described above in such a way that they form a common ray path (and thus form a divergence-changing device 2), and/or one or more divergence-changing devices 1 comprising a retroreflector device 60 may be arranged together with one or more divergence-changing device(s) 1 which does/do not comprise any retroreflector device 60 in such a way that they form a common ray path and a divergence-changing arrangement 2, respectively.

These several divergence-changing devices 1 (and/or one divergence-changing arrangement 2) may also be provided in the ray path together with a 2-D scanning system, wherein the divergence-changing devices 1 and the divergence-changing arrangement 2, respectively, may be provided in the ray path before the 2-D scanning system. Optionally, also a controller 50 may be provided as described above and shown, for example, in FIGS. 2, 4 and 8, which is connected to each of the divergence-changing devices 1 of the divergence-changing arrangement 2, so as to control them (for example the divergence change generated by them by means of a control of the respective ray-deflecting devices 30 thereof), and the controller 50 may optionally also be connected to the 2-D scanning system, so as to control it as described above in such a way that a direction change of the beam of rays 5 may be controlled in two spatial dimensions.

Additional optical components may be arranged also in case of a multiple passage through a divergence-changing device 1 in the ray path between the passages (i.e., for example in the ray path between ray-deflecting device 30 and retroreflector device 60). This may, for example, serve for manipulating/changing the ray diameter, the ray polarization (for example polarization rotation) or the ray profile (for example rotation of the ray profile) of the beam of rays 5. A decrease in the ray diameter may cause a decrease in the necessary mirror diameters and/or in the dimensions of the other components of the divergence-changing device 1. A rotation of polarization and/or ray profile may reduce undesired polarization effects and/or may cause an at least partial compensation of aberrations and may thus improve the ray quality.

According to the invention, the divergence-changing device 1 described herein may comprise additional optical devices in the ray path, which are configured and arranged to compensate at least in part aberrations (such as coma and/or coma-like aberrations) which may be generated in multiple passages through the divergence-changing device 1. This means that the divergence-changing device 1 according to the invention may include optical devices which prevent errors which may occur due to undesired, non-ideal optical imaging (aberrations) on the components of the divergence-changing device 1 from being reinforced and "added", respectively, if a beam of rays 5 passes through the divergence-changing device 1 several times (for example if it comprises a retroreflector device 60), but cause them to be compensated at least in part.

According to the invention, this may, for example, be achieved by a rotation and/or reflection of the beam of rays 5 with respect to the main ray 6 (and the ray axis, respectively) being generated between two passages through a divergence-changing device 1. This is the way to ensure that the aberrations which are respectively produced during the passages before and after the reflection and the rotation, respectively, of the beam of rays 5 act in an opposite direction at least in partial areas of the beam of rays 5.

For example, a ray-rotation device (device that rotates or turns a beam of rays 5 about the main ray 6 and the ray axis, respectively, as axis of rotation) may be arranged in the ray path after the first passage of the beam of rays 5 through the divergence-changing device 1. Then, as described above, the beam of rays 5 is supplied to the ray-deflecting device 30 of a divergence-changing device 1 again by means of the retroreflector device 60 at a (for example slightly) changed angle of incidence. During this (for example) second re-passing through the divergence-changing device 1, the divergence change adds up/is reinforced as described above. According to the invention, the aberrations (for example coma and/or coma-like aberrations), however, act along rotated axes due to the previous ray rotation by means of the ray rotation device, so that at least a partial compensation of the aberrations of the previous (for example first) passage is caused.

A ray rotation device for rotating a ray profile of the beam of rays 5 by a fixed, preset amount or by a dynamically selectable/settable amount may, according to the invention, be realized, for example, by a three-dimensional ray guidance through several reflections. For example, "Dove" prisms and/or so-called "k-mirror" arrangements may be used as ray rotation device according to the invention, wherein the beam of rays 5 is then reflected for example three times or more frequently within the ray rotation device. When rotating the Dove prism or the k-mirror arrangement about the optical axis, the beam of rays 5 rotates by the double angle of rotation (about the ray axis and the main ray 6, respectively). The ray rotation devices described may, according to the invention, further be provided with a retroreflector (for example the retroreflector device 60) having two mirrors (for example mirror 60a/60b), so that then, for example, altogether five reflections occur.

An embodiment of the retroreflector of the ray rotation device having at least three instead of only two mirrors allows, according to the invention, a ray rotation (for example 90 degrees) of the beam of rays 5 together with the re-reflection of the beam of rays 5, so that it hits the ray-deflecting device 5 again, wherein it is, however, rotated/turned about the ray axis and the main ray 6 and/or reflected.

This at least partial aberration compensation as described above may also cause a decrease in undesired polarization effects. Instead of a ray rotation device or in addition thereto, also polarization-rotating elements may be provided in the ray path of the divergence-changing device 1, so as to cause a directed compensation of undesired polarization effects in the divergence-changing device 1.

The invention claimed is:

1. A divergence-changing device for changing the divergence of an electromagnetic beam of rays in a variably adjustable manner, the electromagnetic beam of rays being described by a main ray and optionally comprising such main ray, as well as a plurality of additional rays, comprising
   a ray source for providing the beam of rays with at least the plurality of additional rays,
   a substantially telecentric arrangement having an optical system, which has a first focal point, a first system region and a second system region, and having
   a ray-deflecting device which is arranged in or closely adjacent to the first focal point and which is arranged and configured in such a way that the beam of rays hits the ray-deflecting device from the ray source, wherein the main ray hits the ray-deflecting device in the first focal point or close to the first focal point, and that it may supply the beam of rays coming from the ray source to the first system region of the optical system at different angles of incidence, wherein the optical system is configured in such a way that the beam of rays is imaged by the first system region in such a way that the main ray of the beam of rays supplied to the first system region is deflected from the first system region in a direction that is substantially independent of the angle of incidence, and so that the plurality of additional rays of the beam of rays is imaged at an angle of divergence with respect to the main ray which is different, when compared to before the imaging, and which depends on the angle of incidence, and
   a ray-folding device which is configured in such a way that it deflects the beam of rays imaged by the first system region of the optical system to the second system region of the optical system, wherein the beam of rays is imaged by the second system region of the optical system in such a way that the beam of rays hits the ray-deflecting device again, wherein the main ray hits the ray-deflecting device again in the first focal point or close to the first focal point, and wherein the plurality of additional rays hits the ray-deflecting device again, wherein the beam of rays hitting again is deflected by the ray-deflecting device in such a way that the main ray thereof is substantially stationary and not collinear and/or physically separated from the main ray of the beam of rays which hits the ray-deflecting device from the ray source.

2. The divergence-changing device according to claim 1, wherein the plurality of the additional rays of the beam of rays imaged by the first system region is imaged at an angle of divergence with respect to the main ray which is smaller when compared to before the imaging.

3. The divergence-changing device according to claim 1, wherein the optical system is formed as a transmissive refraction system.

4. The divergence-changing device according to claim 1, wherein the optical system is formed as a reflection system.

5. The divergence-changing device according to claim 4, wherein the first system region of the reflection system is formed as a first paraboloidal reflection face and the second system region of the reflection system is formed as a second paraboloidal reflection face.

6. The divergence-changing device according to claim 1, wherein the first system region has a first system region focal point and the second system region has a second system region focal point, and wherein the first system region and the second system region are arranged to be physically separated from each other, wherein the first system region focal point and the second system region focal point substantially converge spatially and together form the first focal point of the optical system.

7. The divergence-changing device according to claim 1, wherein the first system region and the second system region are formed integrally with each other, thereby integrally forming the optical system.

8. The divergence-changing device according to claim 1, wherein the ray-deflecting device comprises a rotatable mirror having a first mirror surface, wherein the beam of rays can be supplied to the first system region by means of the first mirror surface, and wherein the beam of rays is re-imaged to the first mirror surface by the second system region.

9. The divergence-changing device according to claim 1, wherein the first and the second system regions are configured and arranged in such a way that the first focal point is arranged between the first system region and the second system region, wherein the ray-deflecting device comprises a rotatable double mirror having a first mirror surface and a second mirror surface, wherein both the first mirror surface and the second mirror surface are arranged in or closely adjacent to the first focal point, wherein the beam of rays can be supplied to the first system region by means of the first mirror surface, wherein the beam of rays is imaged to the second mirror surface by the second system region, and wherein a surface normal of the first mirror surface has in or closely adjacent to the first focal point a component which is substantially opposed to a component of a surface normal of the second mirror surface at a position in or closely adjacent to the first focal point.

10. The divergence-changing device according to claim 1, wherein a ray path is defined by the beam of rays which passes across the ray-deflecting device, the first system region of the optical system, the ray-folding device, the second system region of the optical system and again across the ray-deflecting device, wherein the divergence-changing device is provided with at least two optical elements having cylindrical imaging properties, which are arranged to be separated from each other in the ray path, wherein the beam of rays is imaged by means of the at least two optical elements, wherein the optical elements are configured and arranged in such a way that a cylindrical imaging of the beam of rays by an optical element is substantially compensated by the at least one further optical element, so that a substantially point-shaped focus is prevented from being formed between the at least two optical elements.

11. The divergence-changing device according to claim 10, wherein an optical element having a cylindrical imaging property is a cylinder lens.

12. The divergence-changing device according to claim 1, wherein the beam of rays imaged by the first system region of the optical system is imaged in a convergent way and forms an optionally virtual focus, wherein the focus lies at different locations in an optionally virtual focal area as a function of the angle of incidence of the beam of rays on the first system region of the optical system, and wherein the focal area is a curved focal area or is a plane focal area, which is formed in such a way that the main ray of the beam of rays imaged by the first system region does not hit the plane focal area in the normal direction of the plane focal area.

13. The divergence-changing device according to claim 1, further comprising a controller which is configured to control the ray-deflecting device in such a way that the angle of incidence and/or the position of incidence of the beam of rays on the first system region of the optical system is adjustable by the same in a directed and selectable way.

14. The divergence-changing device according to claim 1, wherein the ray-folding device comprises a first ray-folding mirror and a second ray-folding mirror, wherein the first and the second ray-folding mirror are arranged and configured in such a way that the beam of rays supplied to the optical system by means of the ray-deflecting device and imaged by the first system region of the optical system hits the first ray-folding mirror, is deflected by the first ray-folding mirror, optionally via at least one ray-folding intermediate mirror to the second ray-folding mirror, and is deflected by the first ray-folding mirror to the second system region.

15. The divergence-changing device according to claim 1, wherein the first ray-folding mirror is provided with a cylindrical imaging property and the second ray-folding mirror is provided with a cylindrical imaging property, so that the first and the second ray-folding mirrors are optionally two of the at least two optical elements.

16. The divergence-changing device according to claim 1, wherein the ray-folding device and/or the first ray-folding mirror and/or the second ray-folding mirror and/or the at least one ray-folding intermediate mirror are substantially stationary and torque proof relative to the optical system.

17. The divergence-changing device according to claim 1, wherein the ray source and/or the ray-deflecting device and/or the optical system and/or the ray-folding device are formed for being used with a high-performance laser for material processing.

18. The divergence-changing device according to claim 1, wherein the ray-deflecting device is formed as a rotational mirror.

19. The divergence-changing device according to claim 1, wherein the main ray of the beam of rays supplied to the first system region by the ray-deflecting device, deflected by means of the ray-folding device from the first system region to the second system region and imaged by the second system region in such a way that it hits the ray-deflecting device again, spans a three-dimensional space.

20. The divergence-changing device according to claim 1, further comprising a retroreflector device which is arranged and configured in such a way that it images the beam of rays, the main ray of which is deflected in a stationary way by the ray-deflecting device, in such a way that it hits the ray-deflecting device again, wherein the main ray of the beam of rays coming from the retroreflector device hits the ray-deflecting device again in the first focal point or close to the first focal point, so that the beam of rays passes through the divergence-changing device again, wherein the main ray of the beam of rays coming from the retroreflector device optionally hits the ray-deflecting device at an angle that is different from the angle at which the main ray of the beam of rays having passed through the divergence-changing device coming from the ray source is imaged towards the retroreflector device by means of the ray-deflecting device.

21. The divergence-changing arrangement comprising at least or exactly two divergence-changing devices according to claim 1, wherein the at least or exactly two divergence-changing devices are arranged in such a way that they form an upstream divergence-changing device and a divergence-changing device downstream thereof having a common ray path, wherein the beam of rays, the main ray of which is imaged in a stationary way by the upstream divergence-changing device, forms the ray source of the downstream divergence-changing device.

22. A ray position and divergence-changing device, comprising the divergence-changing device according to claim 1, a 2-D scanning system as well as a controller, wherein the divergence-changing device and/or the divergence-changing arrangement and the 2-D scanning system form a common ray path in which the divergence-changing device and the divergence-changing arrangement, if respectively provided, are arranged before the 2-D scanning system, wherein the 2-D scanning system is configured to adjust a direction of propagation of a beam of rays emergent from the divergence-changing device or the divergence-changing arrangement and hitting the 2-D scanning system in two spatial dimensions independent from each other, and wherein the controller is configured to adjust the direction of propagation by means of the 2-D scanning system and the divergence change by means of the divergence-changing device and/or the divergence-changing arrangement in a directed and selectable way according to a control information.

* * * * *